United States Patent
Mate et al.

(10) Patent No.: US 11,570,565 B2
(45) Date of Patent: Jan. 31, 2023

(54) APPARATUS, METHOD, COMPUTER PROGRAM FOR ENABLING ACCESS TO MEDIATED REALITY CONTENT BY A REMOTE USER

(71) Applicant: Nokia Technologies Oy, Espoo (FI)

(72) Inventors: Sujeet Shyamsundar Mate, Tampere (FI); Arto Lehtiniemi, Lempäälä (FI); Antti Eronen, Tampere (FI); Lasse Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/271,755

(22) PCT Filed: Sep. 5, 2019

(86) PCT No.: PCT/EP2019/073776
§ 371 (c)(1),
(2) Date: Feb. 26, 2021

(87) PCT Pub. No.: WO2020/053074
PCT Pub. Date: Mar. 19, 2020

(65) Prior Publication Data
US 2021/0321211 A1    Oct. 14, 2021

(30) Foreign Application Priority Data
Sep. 11, 2018  (EP) .................................... 18193581

(51) Int. Cl.
*H04S 7/00*  (2006.01)
*H04R 5/04*  (2006.01)

(52) U.S. Cl.
CPC ............... *H04S 7/301* (2013.01); *H04R 5/04* (2013.01); *H04R 2460/07* (2013.01);
(Continued)

(58) Field of Classification Search
CPC ............. H04S 2420/11; H04S 2420/03; G06F 3/165; H04R 2460/07
(Continued)

(56) References Cited

U.S. PATENT DOCUMENTS

| | | | |
|---|---|---|---|
| 2011/0145868 A1* | 6/2011 | Hultkrantz | H04N 21/2743 725/62 |
| 2014/0118631 A1 | 5/2014 | Cho | |
| 2016/0212538 A1* | 7/2016 | Fullam | G06T 19/006 |

FOREIGN PATENT DOCUMENTS

| | | |
|---|---|---|
| CN | 206096634 U | 4/2017 |
| EP | 3260950 A1 | 12/2017 |

(Continued)

OTHER PUBLICATIONS

"Bose AR Glasses Hands-On at SXSW 2018", YouTube, Retrieved on Feb. 24, 2021, Webpage available at: https://www.youtube.com/watch?v=5_dCrJjRGT8.

(Continued)

*Primary Examiner* — Yosef K Laekemariam
(74) *Attorney, Agent, or Firm* — Harrington & Smith

(57) ABSTRACT

An apparatus comprising means for: simultaneously controlling content rendered by a hand portable device and content rendered by a spatial audio device; and providing for rendering to a user, in response to an action by the user, of a first part, not a second part, of a spatial audio content via the hand portable device not the spatial audio device.

17 Claims, 17 Drawing Sheets

(52) U.S. Cl.
    CPC ....... *H04S 2400/01* (2013.01); *H04S 2400/11* (2013.01); *H04S 2420/01* (2013.01)

(58) Field of Classification Search
    USPC .......................... 381/303, 334, 367, 370, 376
    See application file for complete search history.

(56) References Cited

FOREIGN PATENT DOCUMENTS

| | | | |
|---|---|---|---|
| EP | 3370133 A1 | 9/2018 | |
| EP | 3457716 | * 9/2018 | ........... H04R 25/001 |

OTHER PUBLICATIONS

"Bose Sunglasses Hands-on: Audio AR Makes More Sense Than You Think", Engadget, Retrieved on Feb. 24, 2021, Webpage available at: https://www.engadget.com/2018/03/10/bose-sunglasses-hands-on-audio-ar-makes-more-sense-than-you-thi/.

Extended European Search Report received for corresponding European Patent Application No. 18193581.8, dated Mar. 26, 2019, 9 pages.

International Search Report and Written Opinion received for corresponding Patent Cooperation Treaty Application No. PCT/EP2019/073776, dated Dec. 17, 2019, 12 pages.

Office action received for corresponding European Patent Application No. 18193581.8, dated Oct. 4, 2021, 5 pages.

\* cited by examiner

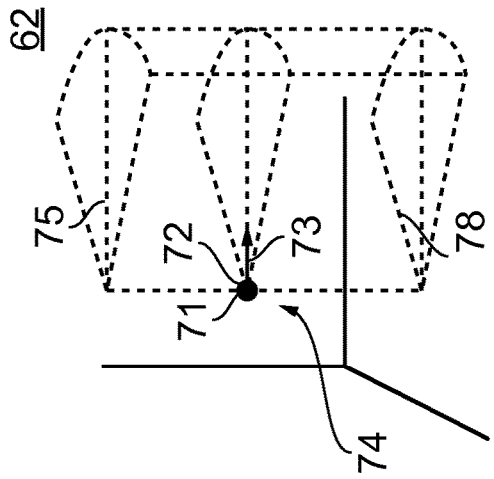
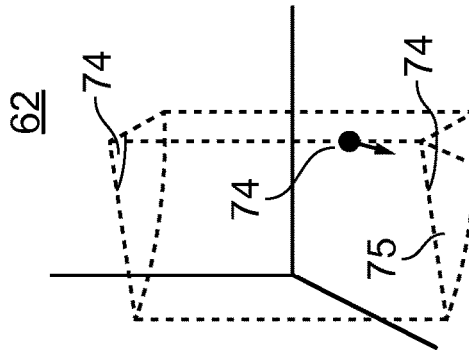
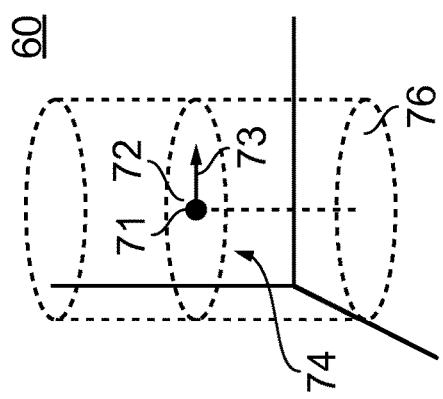
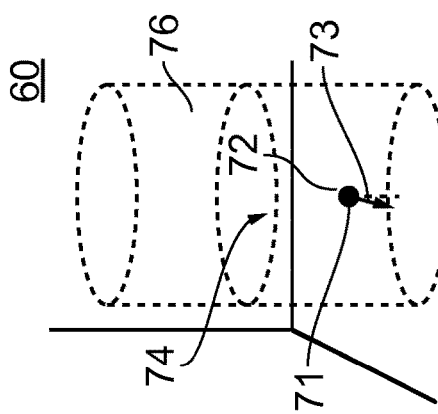
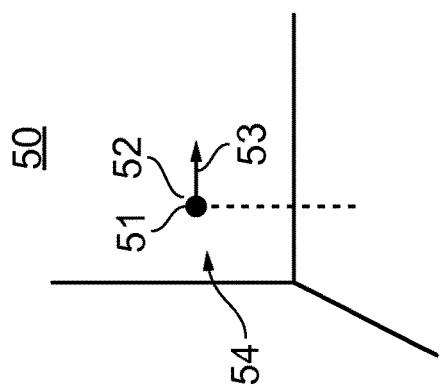
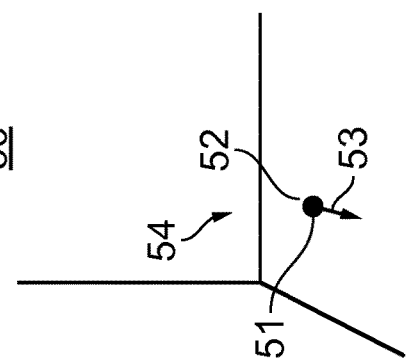

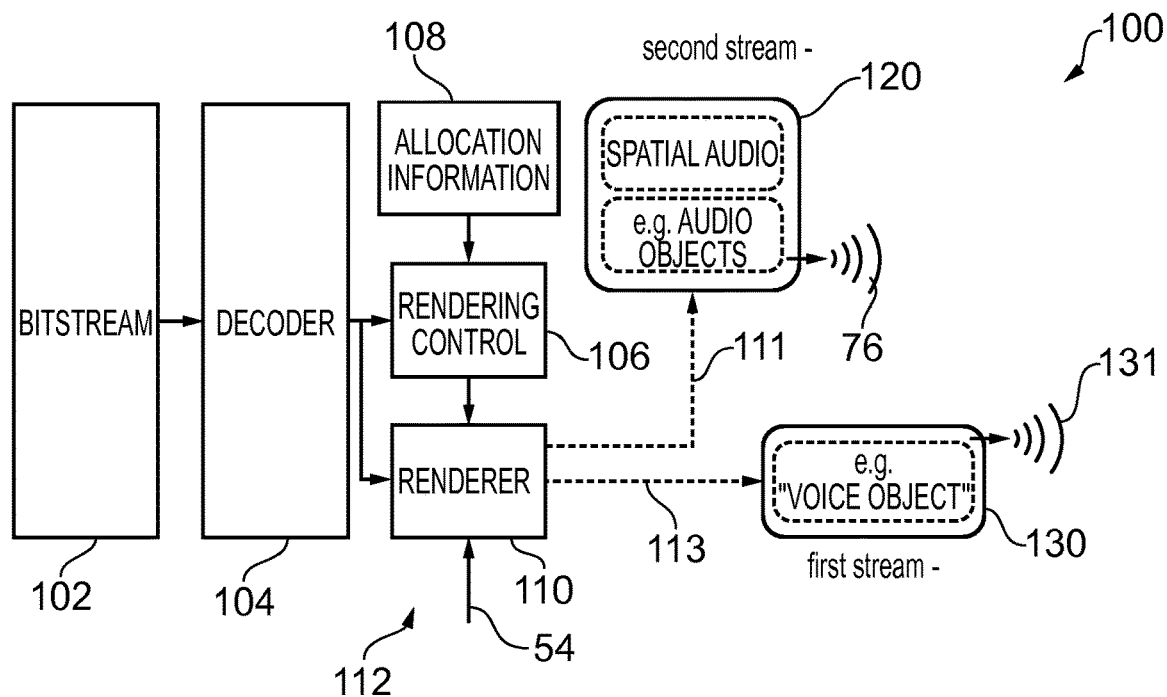
FIG. 2
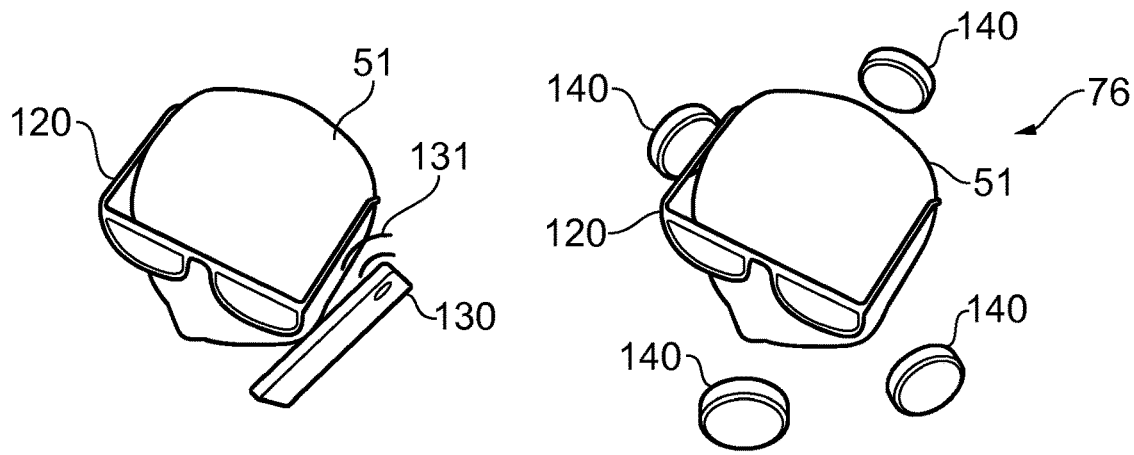
FIG. 3A
FIG. 3B
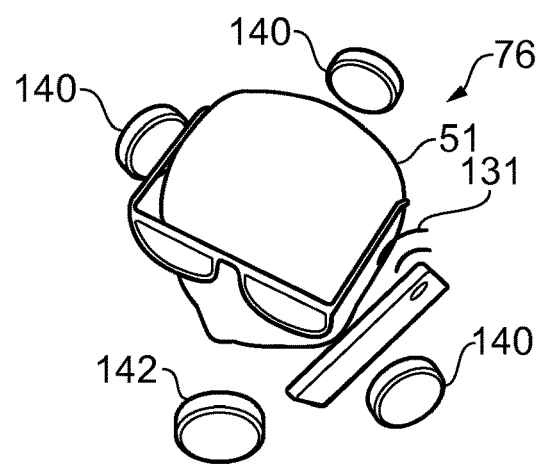
FIG. 3C

APPARATUS, METHOD, COMPUTER PROGRAM FOR ENABLING ACCESS TO MEDIATED REALITY CONTENT BY A REMOTE USER

RELATED APPLICATION

This application claims priority to PCT Application No. PCT/EP2019/073776, filed on Sep. 5, 2019, which claims priority to European Application No. 18193581.8, filed on Sep. 11, 2018, each of which is incorporated herein by reference in its entirety.

TECHNOLOGICAL FIELD

Embodiments of the present disclosure relate to enabling access to mediated reality content by a remote user.

BACKGROUND

When mediated reality is rendered to a user the user experiences, for example visually and/or or aurally, a fully or partially artificial environment as a virtual scene at least partially rendered by an apparatus to a user. The virtual scene is determined by a point of view of a virtual user within a virtual space.

Augmented reality is a form of mediated reality in which a user experiences a partially artificial environment as a virtual scene comprising a real scene, for example a real visual scene and/or real sound scene, of a physical real environment supplemented by one or more visual or audio elements rendered by an apparatus to a user. The term augmented reality implies a mixed reality or hybrid reality. Virtual reality is a form of mediated reality in which a user experiences a fully artificial environment as a virtual scene rendered by an apparatus to a user.

First person perspective-mediated, as applied to mediated reality means that the user's real point of view (location and/or orientation) determines the point of view (location and/or orientation) within the virtual space of a virtual user.

When mediated reality is rendered to a user as a sound scene, a three-dimensional sound field may be created.

BRIEF SUMMARY

According to various, but not necessarily all, embodiments there is provided an apparatus comprising means for:
simultaneously controlling content rendered by a hand portable device and content rendered by a spatial audio device; and
providing for rendering to a user, in response to an action by the user, of a first part, not a second part, of a spatial audio content via the hand portable device not the spatial audio device.

In some but not necessarily all examples, the apparatus comprises means for: causing simultaneous rendering before the action of the user, of the first part of the spatial audio content and the second part of the spatial audio content via the spatial audio device.

In some but not necessarily all examples, the apparatus comprises means for: determining the first part of the spatial audio content and the second part of the spatial audio content, in response to the user action.

In some but not necessarily all examples, the apparatus comprises means for causing simultaneous rendering to the user, in response to the action of the user, of the first part of the spatial audio content via the hand portable device and the second part of the spatial audio content via the spatial audio device.

In some but not necessarily all examples, the spatial audio content is received from a communication network by the apparatus as downlink communication channel from a remote person and wherein the first part of the spatial audio content can comprise a voice of the remote person.

In some but not necessarily all examples, the apparatus comprises means for causing rendering, in response to the user action, of the first part of a spatial audio content via one or more loudspeakers of the hand portable device.

In some but not necessarily all examples, the apparatus comprises means for causing simultaneous rendering of the first part of the spatial audio content via the hand portable device and a second part of the spatial audio content, as binaural audio via loudspeakers of the spatial audio device.

In some but not necessarily all examples, the apparatus comprises means for communicating with the hand portable device and/or the spatial audio device to determine when the action of the user has occurred, wherein the action of the user comprises movement of hand portable device towards a head of the user.

In some but not necessarily all examples of a first embodiment, the apparatus comprises means for causing simultaneous rendering to the user, in response to the action of the user, of the first part of the spatial audio content via the hand portable device and the second part of the spatial audio content via the spatial audio device.

In some but not necessarily all examples of the first embodiment, a spatial audio scene defined by the second part of the spatial audio content is modified in dependence upon a position of the hand portable device In some but not necessarily all examples of the first embodiment, one or more audio objects at least partially defining the spatial audio scene are moved in dependence upon a position of the hand portable device, to avoid co-location of an audio object and the first part of the spatial audio content, which is determined by the position of the hand portable device.

In some but not necessarily all examples of the first embodiment, the first part of the spatial audio content relates to a first voice associated with a first ear of the user, at which the hand portable device is positioned, and wherein the second part of the spatial audio content relates to at least a second different voice, wherein the spatial audio scene defined by the second part of the spatial audio content is modified to place the second voice at a second ear of the user, opposite the first ear.

In some but not necessarily all examples, the apparatus comprises means, responsive to the movement of the hand portable device, to edit the second part of the spatial audio content.

In some but not necessarily all examples, the first part of the spatial audio content relates to an incoming call and the second part of the spatial content relates, at least to, content that continues to be rendered after receiving the incoming call.

In some but not necessarily all examples of a second embodiment, the apparatus comprises means for enabling selection of the first part of the spatial audio content by the user using first-person-perspective mediated reality.

In some but not necessarily all examples of the second embodiment, the first part of the spatial audio content is an audio object selected by a direction of user attention or an audio scene selected by a direction of user attention.

In some but not necessarily all examples of the second embodiment, the first part of the spatial audio content is a first moving audio object, wherein the first part of the audio content is rendered as if the first audio object were stationary.

In some but not necessarily all examples, the apparatus comprises means for enabling adaptation of the second part of the spatial audio content using first-person-perspective mediated reality, after user action while using at least the spatial audio device.

In some but not necessarily all examples, the apparatus comprises means for enabling, after the user action, adaptation of the second part of the spatial audio content in accordance with first-person-perspective mediated reality and rendering of the adapted second part of the spatial audio content via at least the spatial audio device.

In some but not necessarily all examples, the apparatus comprises means for enabling, after the user action, adaptation of the second part of the spatial audio content in accordance with first-person-perspective mediated reality and rendering of the adapted second part of the spatial audio content via at least the spatial audio device; means for disabling, after a subsequent user action, adaptation of the second part of the spatial audio content in accordance with first-person-perspective mediated reality and rendering of the second part of the spatial audio content in accordance with a fixed first-person-perspective via at least the spatial audio device;

In some but not necessarily all examples, a hand portable device comprises a display and is configured as or is housing the apparatus.

According to various, but not necessarily all, embodiments there is provided a method comprising:

simultaneously controlling content rendered by a hand portable device and content rendered by a spatial audio device; and providing for rendering to a user, in response to an action by the user, of a first part, not a second part, of a spatial audio content via the hand portable device not the spatial audio device.

According to various, but not necessarily all, embodiments there is provided a computer program that when run on one or more processors, enables:

simultaneously controlling content rendered by a hand portable device and content rendered by a spatial audio device; and providing for rendering to a user, in response to an action by the user, of a first part, not a second part, of a spatial audio content via the hand portable device not the spatial audio device.

According to various, but not necessarily all, embodiments there is provided an apparatus comprising:

at least one processor; and at least one memory including computer program code the at least one memory and the computer program code configured to, with the at least one processor, cause the apparatus at least to perform:

simultaneously controlling content rendered by a hand portable device and content rendered by a spatial audio device; and providing for rendering to a user, in response to an action by the user, of a first part, not a second part, of a spatial audio content via the hand portable device not the spatial audio device.

According to various, but not necessarily all, embodiments there is provided examples as claimed in the appended claims.

BRIEF DESCRIPTION

Some example embodiments will now be described with reference to the accompanying drawings in which:

FIGS. 1A, 1B, 1C, 1D, 1E, 1F show an example embodiment of the subject matter described herein;

FIG. 2 shows another example embodiment of the subject matter described herein; FIGS. 3A, 3B, 3C show another example embodiment of the subject matter described herein;

DEFINITIONS

Figure 4A:
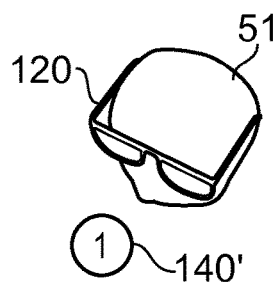
FIGS. 4A, 4B, 4C show another example embodiment of the subject matter described herein.

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view (position) within the virtual visual space.

'virtual visual object' is a visible virtual object within a virtual visual scene.

"sound space" (or "virtual sound space") refers to an arrangement of sound sources in a three-dimensional space. A sound space may be defined in relation to recording sounds (a recorded sound space) and in relation to rendering sounds (a rendered sound space).

"sound scene" (or "virtual sound scene") refers to a representation of the sound space listened to from a particular point of view (position) within the sound space.

"sound object" refers to a sound source that may be located within the sound space. A source sound object represents a sound source within the sound space, in contrast to a sound source associated with an object in the virtual visual space. A recorded sound object represents sounds recorded at a particular microphone or location. A rendered sound object represents sounds rendered from a particular location.

"virtual space" may mean a virtual visual space, mean a sound space or mean a combination of a virtual visual space and corresponding sound space. In some examples, the virtual space may extend horizontally up to 360° and may extend vertically up to 180°.

"virtual scene" may mean a virtual visual scene, mean a sound scene or mean a combination of a virtual visual scene and corresponding sound scene.

'virtual object' is an object within a virtual scene, it may be an augmented virtual object (e.g. a computer-generated virtual object) or it may be an image of a real object in a real space that is live or recorded. It may be a sound object and/or a virtual visual object.

"Virtual position" is a position within a virtual space. It may be defined using a virtual location and/or a virtual orientation. It may be considered to be a movable 'point of view'.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional (virtual) listener whose point of view defines the sound scene and a notional (virtual) viewer whose point of view defines the virtual visual scene (or visual scene) are at the same location and orientation, that is they have the same point of view (same virtual position).

"real space" (or "physical space") refers to a real environment, which may be three dimensional.

"real scene" refers to a representation of the real space from a particular point of view (position) within the real space.

"real visual scene" refers to a visual representation of the real space viewed from a particular real point of view (position) within the real space.

"mediated reality" in this document refers to a user experiencing, for example visually and/or aurally, a fully or partially artificial environment (a virtual space) as a virtual scene at least partially rendered by an apparatus to a user. The virtual scene is determined by a point of view (virtual position) within the virtual space. Displaying the virtual scene means providing a virtual visual scene in a form that can be perceived by the user.

"augmented reality" in this document refers to a form of mediated reality in which a user experiences a partially artificial environment (a virtual space) as a virtual scene comprising a real scene, for example a real visual scene, of a physical real environment (real space) supplemented by one or more visual or audio elements rendered by an apparatus to a user. The term augmented reality implies a mixed reality or hybrid reality and does not necessarily imply the degree of virtuality (vs reality) or the degree of mediality;

"virtual reality" in this document refers to a form of mediated reality in which a user experiences a fully artificial environment (a virtual visual space) as a virtual scene displayed by an apparatus to a user;

"virtual content" is content, additional to real content from a real scene, if any, that enables mediated reality by, for example, providing one or more augmented virtual objects.

"mediated reality content" is virtual content which enables a user to experience, for example visually and/or aurally, a fully or partially artificial environment (a virtual space) as a virtual scene. Mediated reality content could include interactive content such as a video game or non-interactive content such as motion video.

"augmented reality content" is a form of mediated reality content which enables a user to experience, for example visually and/or aurally, a partially artificial environment (a virtual space) as a virtual scene. Augmented reality content could include interactive content such as a video game or non-interactive content such as motion video.

"virtual reality content" is a form of mediated reality content which enables a user to experience, for example visually and/or aurally, a fully artificial environment (a virtual space) as a virtual scene. Virtual reality content could include interactive content such as a video game or non-interactive content such as motion video.

"perspective-mediated" as applied to mediated reality, augmented reality or virtual reality means that user actions determine the point of view (virtual position) within the virtual space, changing the virtual scene;

"first person perspective-mediated" as applied to mediated reality, augmented reality or virtual reality means perspective mediated with the additional constraint that the user's real point of view (location and/or orientation) determines the point of view (virtual position) within the virtual space of a virtual user;

"third person perspective-mediated" as applied to mediated reality, augmented reality or virtual reality means perspective mediated with the additional constraint that the user's real point of view does not determine the point of view (virtual position) within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"virtual user" defines the point of view (virtual position—location and/or orientation) in virtual space used to generate a perspective-mediated sound scene and/or visual scene. A virtual user may be a notional listener and/or a notional viewer.

"notional listener" defines the point of view (virtual position—location and/or orientation) in virtual space used to generate a perspective-mediated sound scene, irrespective of whether or not a user is actually listening "notional viewer" defines the point of view (virtual position—location and/or orientation) in virtual space used to generate a perspective-mediated visual scene, irrespective of whether or not a user is actually viewing.

Three degrees of freedom (3DoF) describes mediated reality where the virtual position is determined by orientation only (e.g. the three degrees of three-dimensional orientation). An example of three degrees of three-dimensional orientation is pitch, roll and yaw. In relation to first person perspective-mediated reality 3DoF, only the user's orientation determines the virtual position.

Six degrees of freedom (6DoF) describes mediated reality where the virtual position is determined by both orientation (e.g. the three degrees of three-dimensional orientation) and location (e.g. the three degrees of three-dimensional location). An example of three degrees of three-dimensional orientation is pitch, roll and yaw. An example of three degrees of three-dimensional location is a three-dimensional coordinate in a Euclidian space spanned by orthogonal axes such as left-to-right (x), front to back (y) and down to up (z) axes. In relation to first person perspective-mediated reality 6DoF, both the user's orientation and the user's location in the real space determine the virtual position. In relation to third person perspective-mediated reality 6DoF, the user's location in the real space does not determine the virtual position. The user's orientation in the real space may or may not determine the virtual position.

Three degrees of freedom 'plus' (3DoF+) describes an example of six degrees of freedom where a change in location (e.g. the three degrees of three-dimensional location) is a change in location relative to the user that can arise from a postural change of a user's head and/or body and does not involve a translation of the user through real space by, for example, walking.

DETAILED DESCRIPTION

FIGS. 1A, 1B, 1C, 1D, 1E, 1F illustrate first person perspective mediated reality. In this context, mediated reality means the rendering of mediated reality for the purposes of achieving mediated reality for a remote user, for example augmented reality or virtual reality. It may or may not be user interactive. The mediated reality may support 3DoF, 3DoF+ or 6DoF. Alternatively, the mediated reality may support 3DoF or 6DoF, not 3DoF+.

FIGS. 1A, 1C, 1E illustrate at a first time a real space 50, a sound space 60 and a visual space 62. There is correspondence between the sound space 60 and the virtual visual space 62. A user 51 in the real space 50 has a point of view (a position) 54 defined by a location 52 and an orientation 53. The location is a three-dimensional location and the orientation is a three-dimensional orientation.

In an example of 3DoF mediated reality, the user's real point of view 54 (orientation) determines the point of view 74 (virtual position) within the virtual space of a virtual user. An orientation 53 of the user 51 controls a virtual orientation 73 of a virtual user 71. There is a correspondence between the orientation 53 and the virtual orientation 73 such that a change in the orientation 53 produces the same change in the virtual orientation 73.

The virtual orientation 73 of the virtual user 71 in combination with a virtual field of view 78 defines a virtual visual scene 75 within the virtual visual space 62. In some examples, it may additionally or alternatively define a virtual sound scene 76.

A virtual visual scene 75 is that part of the virtual visual space 62 that is displayed to a user. A virtual sound scene 76 is that part of the virtual sound space 60 that is rendered to a user. The virtual sound space 60 and the virtual visual space 62 correspond in that a position within the virtual sound space 60 has an equivalent position within the virtual visual space 62. In 3DoF mediated reality, a change in the location 52 of the user 51 does not change the virtual location 72 or virtual orientation 73 of the virtual user 71.

In the example of 6DoF mediated reality, the user's real point of view 54 (location and/or orientation) determines the point of view 74 (virtual position) within the virtual space of a virtual user 71. The situation is as described for 3DoF and in addition it is possible to change the rendered virtual sound scene 76 and the displayed virtual visual scene 75 by movement of a location 52 of the user 51. For example, there may be a mapping between the location 52 of the user 51 and the virtual location 72 of the virtual user 71. A change in the location 52 of the user 51 produces a corresponding change in the virtual location 72 of the virtual user 71. A change in the virtual location 72 of the virtual user 71 changes the rendered sound scene 76 and also changes the rendered visual scene 75.

This may be appreciated from FIGS. 1B, 1D and 1F which illustrate the consequences of a change in location 52 and orientation 53 of the user 51 on respectively the rendered sound scene 76 (FIG. 1D) and the rendered visual scene 75 (FIG. 1F). The change in location may arise from a postural change of the user and/or a translation of the user by walking or otherwise.

First person perspective mediated reality may control only a virtual sound scene 76, a virtual visual scene 75 and both a virtual sound scene 76 and virtual visual scene 75, depending upon implementation.

In some situations, for example when the sound scene is rendered to a listener through a head-mounted audio output device, for example headphones using binaural audio coding, it may be desirable for a portion of the rendered sound space to remain fixed in real space when the listener turns their head in space. This means that the rendered sound space needs to be rotated relative to the audio output device by the same amount in the opposite sense to the head rotation. The orientation of the portion of the rendered sound space tracks with the rotation of the listener's head so that the orientation of the rendered sound space remains fixed in space and does not move with the listener's head.

A sound 'locked' to the real world may be referred to as a diegetic sound.

A sound 'locked' to the user's head may be referred to as a non-diegetic sound.

The rendering of a virtual sound scene 76 may also be described as providing spatial audio or providing immersive audio. The virtual sound scene 76 comprises one or more sound sources at different positions in the sound space 60. The audio rendered to the user depends upon the relative position of the virtual user from the positions of the sound sources. Perspective mediated virtual reality, for example first person perspective mediated reality enables the user 51 to change the position of the virtual user 71 within the sound space 60 thereby changing the positions of the sound sources relative to the virtual user which changes the virtual sound scene 76 rendered to the user 51.

Channel-based audio, for example, n,m surround sound (e.g. 5.1, 7.1 or 22.2 surround sound) or binaural audio, can be used or scene-based audio, including spatial information about a sound field and sound sources, can be used.

Audio content may encode spatial audio as audio objects. Examples include but are not limited to MPEG-4 and MPEG SAOC. MPEG SAOC is an example of metadata-assisted spatial audio.

Audio content may encode spatial audio as audio objects in the form of moving virtual loudspeakers.

Audio content may encode spatial audio as audio signals with parametric side information or metadata. The audio signals can be, for example, First Order Ambisonics (FOA) or its special case B-format, Higher Order Ambisonics (HOA) signals or mid-side stereo. For such audio signals, synthesis which utilizes the audio signals and the parametric metadata is used to synthesize the audio scene so that a desired spatial perception is created.

The parametric metadata may be produced by different techniques. For example, Nokia's spatial audio capture (OZO Audio) or Directional Audio Coding (DirAC) can be used. Both capture a sound field and represent it using parametric metadata. The parametric metadata may for example comprise: direction parameters that indicate direction per frequency band; distance parameters that indicate distance per frequency band; energy-split parameters that indicate diffuse-to-total energy ratio per frequency band. Each time-frequency tile may be treated as a sound source with the direction parameter controlling vector based amplitude panning for a direct version and the energy-split parameter controlling differential gain for an indirect (decorrelated) version.

The audio content encoded may be speech and/or music and/or generic audio.

3GPP IVAS (3GPP, Immersive Voice and Audio services), which currently under development, is expected to support new immersive voice and audio services, for example, mediated reality.

In some but not necessarily all examples amplitude panning techniques may be used to create or position a sound object. For example, the known method of vector-based amplitude panning (VBAP) can be used to position a sound source.

A sound object may be re-positioned by mixing a portion direct form of the object (an attenuated and directionally-filtered direct sound) with an indirect form of the object (e.g. positioned directional early reflections and/or diffuse reverberant).

FIG. 2 illustrates an example of a system 100 for controlling rendering of spatial audio content 102.

In this example, the system 100 comprises an apparatus 112 that receives the spatial audio content 102 and produces a first part 113 of the spatial audio content 102 (first audio content) for a first device 130 and a second part 111 of the spatial audio content 102 (second audio content) for a second device 120. In this example, the first device 130 is a hand portable device. A hand portable device is a device that has a size and mass that allows it to ported by hand. It some examples, it has a size and mass that allows it to moved relative to a user's body, for example lifted towards a user's ear by the user easily using one hand. It some examples, it has a size and mass that allows it carried in a user's pocket. In this example, the second device 120 is a spatial audio device and the second part 111 of the spatial audio content 102 is spatial audio content—the spatial audio device 120 is configured to render the second part 111 of the spatial audio content 102 as a rendered sound scene 76 with positioned rendered sound sources.

The spatial audio device 120 may be configured to render only spatial audio or may be configured to render spatial audio and also a virtual visual scene 78.

The stereo loudspeakers are configured to render binaural audio content or other spatial audio content. The loudspeakers position sound sources 140 (not illustrated in FIG. 2) within a sound space 60. The rendered sound scene 76 is dependent upon the received second part 111 of the spatial audio content 102 and, in some examples, personal rendering settings of the spatial audio device 120. The second part 111 of the spatial audio content 102 has or is converted to have a format suitable for rendering by the second device 120.

The spatial audio device 120 may be a head-mounted audio output device, for example headphones. The headphones may use in-ear loudspeakers, over-ear bins with loudspeakers or adjacent-ear loudspeakers that are, for example, part of the 'temples' of a frame for eye glasses.

The spatial audio device 120 may be passthrough headphones that allow the user to hear not only audio rendered by one or more loudspeakers of the spatial audio device 120 but to also hear clearly ambient audio such as audio output from the hand portable device 130.

The spatial audio device 120 is configured to enable first person perspective mediated reality. For example, the spatial audio device 120 may include circuitry that is capable of tracking movement of a user's head while they are wearing the spatial audio device 120.

The spatial audio device 120 may, in some but not necessarily all examples, include a head-mounted display for one or both eyes of the user 51.

The hand portable device 130 comprises one or more loudspeakers and is configured to cause rendering of the first part 113 of the spatial audio content 102 via the one or more loudspeakers.

Although the hand portable device 130 is, in some examples, capable of combined playback from multiple loudspeakers, it is not necessarily capable of spatial audio output. The output audio 131 is therefore heard as if emitted from the hand portable device 130.

In contrast, the spatial audio device 120 is capable of placing sound sources 140 within the sound space 60.

In some, but not necessarily all examples, the hand portable device 130 is a mobile cellular telephone.

The apparatus 112 decodes the received spatial audio content 102 and causes rendering to a user 51 of a first part 113 of the spatial audio content 102 via the hand portable device 130 and causes rendering to the user 51, of a second part 111 of the spatial audio content 102 via the spatial audio device 120. The apparatus 112 comprises a decoder 104 for decoding the spatial audio content 102. The decoding produces the spatial audio content 102 in a format that can be used to identify and separately process sound sources 140. The decoded spatial audio content is provided to rendering control block 106 and renderer 110. The rendering control block 106 determines how the sound sources 140 within the spatial audio content 102 will be rendered. This determination is based upon received allocation information 108. The rendering control block 106 provides a control output to the renderer 110.

The renderer 110 under the control of the control signals from the rendering control block 106 renders the spatial audio content received from the decoder 104 as a first part 113 for rendering by the hand portable device 130 and as a second part 111 for rendering by the spatial audio device 120. The second part 111 is spatial audio content.

The renderer 110 is configured to enable first person perspective mediated reality with respect to the second part 111 of the spatial audio content 102. Consequently, the renderer 110 takes into account the point of view 54 of the user 51.

The second part 111 of the spatial audio content 102 may be communicated over any suitable link to the spatial audio device 120. In some but not necessarily all example the link is a wireless link such as a radio link. The radio link may be provided by any suitable protocol such as Bluetooth or WLAN.

The first part 113 of the spatial audio content 102 may be communicated over any suitable link to the hand portable device 130. In some but not necessarily all example the link is a wireless link such as a radio link. The radio link may be provided by any suitable protocol such as Bluetooth or WLAN.

In some but not necessarily all examples, the renderer 100 could comprise different renderers for the first part 113 and the second part 111 of the spatial audio content 102.

The rendering control block 106 is configured to identify and control each sound source separately if required. It is capable of controlling the renderer 110 to combine one or more sound sources within a rendered sound scene 76 in response to the second part 111 of the spatial audio content 102.

In some examples, the allocation information 108 is optional. For example, in an embedded codec, the lowest layer (monovoice) may be automatically transferred as the first part 113 of the spatial audio content 102, and the other layers (spatial enhancement layers) may be provided as the second part 111 of the spatial audio content 102.

In other examples, the form of the rendered sound scene 76 can be controlled by the allocation information 108.

In this example the rendering control block 106 and the renderer 110 are housed within the same apparatus 112, in other examples, the rendering control block 106 and the renderer 110 may be housed in separate devices. In either implementation, there is provided an apparatus 112 comprising means for simultaneously controlling content 131 rendered by a hand portable device 130 and content 76 rendered by a spatial audio device 120; and providing for rendering to a user 51, in response to an action by the user 51, of a first part 113, not a second part 111, of a spatial audio content 102 via the hand portable device 130 not the spatial audio device 120.

The apparatus 112 may comprise means, such as the rendering control block 106, for determining the first part 113 of the spatial audio content 102 and the second part 111 of the spatial audio content 102, in response to the user action.

The apparatus 112 also comprises means for causing simultaneous rendering to the user, in response to the action of the user of the first part 113 of the spatial audio content 102 via the hand portable device 130 and also the second part 111 of the spatial audio content 102 via the spatial audio device 120. The spatial audio device 120 renders the second part 111, not the first part 113 and the hand portable device 130 renders the first part 113, not the second part 111. In some examples, the hand portable device 130 renders only the first part 113 and the spatial audio device 120 renders only the second part 111.

The spatial audio content 102, in some but not necessarily all examples, is received from a communication network by the apparatus 112. The spatial audio content 102 may, for example, define a sound scene or may, for example, be an immersive call. An immersive call is provided in a downlink communication link from a remote person and, in this example, but not necessarily all examples, the first part 113 of the spatial audio content 102 can comprise a voice of the remote person and/or ambient sound.

The rendering control module 106 may be configured to control whether a sound source 140 is rendered as diegetic content or as non-diegetic content. Diegetic content has a position in the sound space 60 that corresponds to a position in the real space 50. The location of the sound source relative to the user 51 is controlled by first person perspective mediated reality. In contrast, non-diegetic content has no position in the real space 50 and is not subject to modification as a consequence of first person perspective mediated reality. Examples of non-diegetic content include, for example, ambient sound or a "narrator" voice.

Whether or not to render a sound source 140 as diegetic content or non-diegetic content can be dependent upon whether the sound source 140 is to be rendered on the hand portable device 130 or the spatial audio device 120. For example, the first part 113 of the spatial audio content 102 may be a non-diegetic sound source 140. The second part 110 of the spatial audio content 102 may be diegetic content and/or non-diegetic content.

In the examples of FIG. 3A, 3B, 3C, the action by the user that causes rendering to the user of the first part 113 of the spatial audio content 102 via the hand portable device 130 and the rendering of the second part 111 of the spatial audio content 102 via the spatial audio device 120 is the lifting of the hand portable device 130 towards an ear of the user 51. It should of course be appreciated that different user actions, including for example interaction and/or indication, may also cause such rendering.

FIG. 3A illustrates an example in which the hand portable device 130 renders 131 the first part 113 of the spatial audio content 102.

FIG. 3B illustrates an example in which the spatial audio device 120 renders the second part 111 of the spatial audio content 102 as a rendered sound scene 76 comprising sound sources 140. Rendering the sound scene 76 comprises rendering one or more sound sources at respective positions in the sound space 60.

FIG. 3C illustrates the simultaneous rendering to the user 51, in response to the action of the user 51, of the first part 113 of the spatial audio content 102 via the hand portable device 130 and the second part 111 of the spatial audio content 102 via the spatial audio device 120. In this example, the action performed by the user to cause rendering to the user 51, of the first part 113 of the spatial audio content 102 via the hand portable device 130, is lifting the hand portable device 130 to the left ear of the user 51.

In this example, the apparatus 112 comprises means for communicating with the hand portable device 130 and/or the spatial audio device 120 to determine when the action of the user has occurred. This may, for example, be detected by using a proximity detector for the hand portable device 130 that detects that the hand portable device 130 is adjacent an ear of the user 51 by, for example, measuring acoustic impedance or detects that the hand portable device 130 is adjacent the spatial audio device 120 by detecting the spatial audio device 120. Alternatively, the hand portable device 130 may use inertial measurement units to measure the movement of the hand portable device 130 and detect a movement that corresponds to an upward lift of the hand portable device 130 in combination with an upright orientation of the hand portable device 130.

In other examples, the spatial audio device 120 may comprise a proximity detector for detecting proximity of the hand portable device 130.

The use of the lifting of the hand portable device 130 to an ear of the user 51 to cause the splitting of the spatial audio data 102 into a first part 113 for the hand portable device 130 and a second part 111 for the spatial audio device 120 is particularly useful when the spatial audio content 102 relates to an incoming immersive telephone call. An immersive telephone call is a telephone call that includes spatial audio content.

Where the incoming spatial audio content 102 is an immersive telephone call, the first part 113 of the spatial audio content 102 may be content that renders a voice of a caller. The voice of the caller may then be removed from the spatial sound scene defined by the spatial audio content of the incoming immersive telephone call to produce the second part 111 of the spatial audio content 102 which is rendered by the spatial audio device 120 as a rendered sound scene 76.

In some examples, the spatial audio content 102 may be entirely rendered by the spatial audio device 120 before the user action causes the splitting of the spatial audio content 102 into the first part 113 for the hand portable device 130 and the second part 111 for the spatial audio device 120. Consequently, before the action of the user, the first part 113 and the second part 111 of the spatial audio content 102 may be simultaneously rendered by the spatial audio device 120.

The following is an example of a use case of the system 100. The user 51 is wearing the spatial audio device 120 and has the hand portable device 130 in his pocket. A friend of the user calls him on an immersive telephone call, for example using IVAS. The user 51 is alerted to the incoming immersive call via a ringtone of the hand portable device 130, via content rendered by the spatial audio device 120 or by both. The user 51 wants to receive the incoming immersive call on his hand portable device 130 but also wishes to hear an ambient signal of his friend. The user 51 answers the incoming immersive call by touching the hand portable device 130 against the spatial audio device 120 at his ear. The rendering control module 106, which may be part of the call software of the hand portable device 130, allocates the caller's voice (the friend's voice) to the hand portable device 130 as the first part 113 of the spatial audio content 102 and the ambient signal to the spatial audio device 120 as the second part 111 of the spatial audio content 102. The spatial audio device 120 allows the user to hear not only audio rendered by one or more loudspeakers of the spatial audio device 120 but to also hear clearly ambient audio such as audio output from the hand portable device 130. The user hears the transmitted ambient signal around him as a rendered sound scene 76, rendered by the spatial audio device 120, and uses the hand portable device 130 in a traditional way to hear the caller's voice. The user 51 can, for example, switch the hand portable device 130 from ear to ear and, may, in some examples, be able to use the hand portable device 130 in a hands-free mode. A user interface on the hand portable device 130 and/or the spatial audio device 120 enables the user 51 to control allocation information 108. The allocation information 108 may, for example, be varied to control a volume of the second part 111 of the spatial audio content rendered by the spatial audio device 120 and/or to control a volume of the first part 113 of the spatial audio content 102 rendered by the hand portable device 130.

In the examples illustrated in FIGS. 4A to 4C and 5A to 5C, the hand portable device 130 is used to render a first part 113 of the spatial audio content 102 and the spatial audio device 120 is used to render a second part 111 of the spatial audio content 102. The hand portable device 130 and the spatial audio device 120 are therefore used simultaneously for the rendering of audio content. It is therefore possible for the rendered audio content from one device to affect the user's perception of the audio content rendered by the other device. In the examples illustrated the second part 111 of the spatial audio content is adapted to move one or more sound sources 140 within the second part 111 of the spatial audio content to avoid this problem. The sound source 140 that is moved is an additional sound source. It may, for example, be an internal diegetic sound source from within the immersive call content other than the primary voice of the caller or it may be an external additional sound source from content other than the immersive call.

The internal additional sound source may, for example, be another person talking (not ambient background noise). This may, for example, arise if the immersive call is a multi-person teleconference call. In some examples, when the user of the hand portable device 130 and the spatial audio device 120 is in a multi-party teleconference call with a 2nd remote party, a 3rd remote party, a 4th remote party etc, then user can select which remote party's voice is rendered from the hand portable device 130 and the other two other remote parties would continue to be rendered in the spatial audio output of the spatial audio device 120 The user can individually select which ones of the multiple remote parties participating in the multi-person teleconference call to respectively separate to hand portable device 130 and the spatial audio device 12.

The external additional sound source may, for example, arise from on-going content that is not stopped or paused and which continues (at least partially) when the immersive telephone call is received, or, may be, new content, separate to the immersive call, started after receiving the immersive call.

In some, but not necessarily all examples, the additional sound source may be selected by the user, for example using a user interface of the hand portable device 130 or of the spatial audio device 120.

Examples of external additional sound sources include, for example, music playback, messages, advertisements and contextual guidance.

In FIGS. 4A to 4C and 5A to 5C, a spatial audio scene 76 defined by the second part 111 of the spatial audio content 102 is modified in dependence upon a position 133 of the hand portable device 130.

For example, a position of an additional source 140' is moved 144 based on user action 137, for example movement of the hand portable device 130 to a new position.

FIG. 4A illustrates a position of a particular sound source 140' in the spatial audio content 102 before the spatial audio content 102 has been split, in response to the user action 137, into a first part 113 for the hand portable device 130 and a second part 111 for the spatial audio device 120.

Figure 4B:
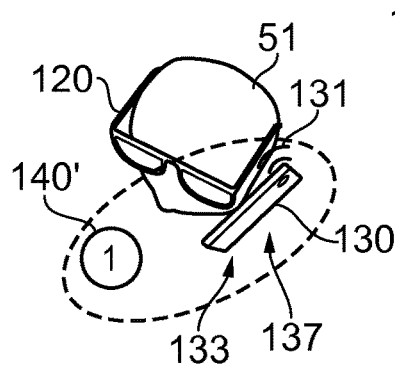
Figure 4C:
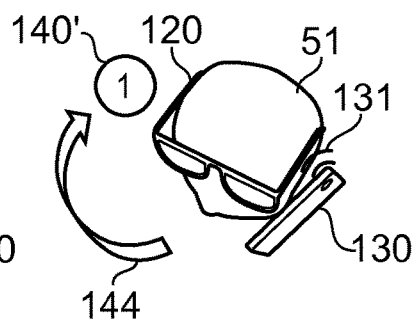

FIG. 4B illustrates the situation after the user 51 has performed the action 137 that causes the spatial audio content 102 to be split into the first part 113 and the second part 111. The first part 113 is or will be rendered by the hand portable device 130 as audio content 131 in the left ear of the user, where the hand portable device 130 is located. As illustrated in FIG. 4C, the rendering control module 106 causes the renderer 110 to adapt the second part 111 of the spatial audio content 102 to change a position of the spatial audio source 140'. In this example the sound source 140' is moved 144 to be adjacent a right ear of the user 51.

Figure 5A:
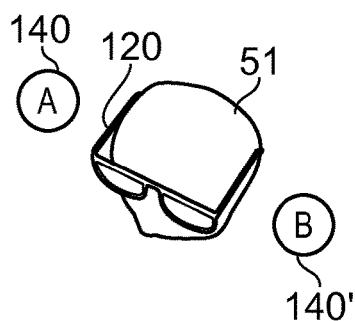
FIGS. 5A, 5B, 5C show another example embodiment of the subject matter described herein.
Figure 5B:
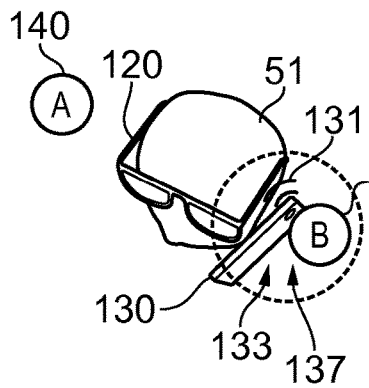
Figure 5C:
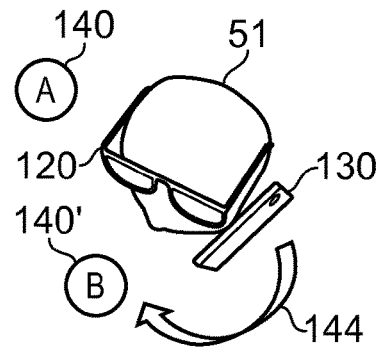

FIGS. 5A, 5B and 5C are similar to FIGS. 4A, 4B and 4C, however, there are now two original sound sources A, B and initial position of the particular sound source B 140 that is moved is different. In the example of FIG. 5B, the particular sound source 140' of the rendered sound scene 76 is directly adjacent the left ear of the user and it is moved 144 away from the left ear of the user to create spatial separation between the additional sound source 140' and the hand portable device 130.

The allocation information 108 may provide information identifying a location of the hand portable device 130 in a three-dimensional space. This may, for example, indicate that it is proximal to a left ear or a right ear of the user or may provide a three-dimensional position in the real space 50.

The rendering control module 106 is configured to determine a distance separation between the position of the hand portable device 130 and the additional sound source 140'. If the separation distance is below a threshold value, the rendering control module 106 determines that the additional sound source 140' is sub-optimally placed. It may, for example, determine that there is spatial conflict as illustrated in FIG. 4B or co-location as illustrated in FIG. 5B.

The rendering control module 106 modifies the spatial audio sound scene 76 by moving at least the additional sound source 140'. In some, but not necessarily all examples, only the additional sound source 140' that is determined to be sub-optimally placed is moved. In other examples, the whole of the rendered sound scene 76 is rotated relative to the user 51 to remove the spatial conflict or co-location.

In the examples of FIGS. 4A and 5A, before the user action 137 causes modification of the spatial audio content 102 by splitting it into the first part 113 for the hand portable device 130 and the second part 111 for the spatial audio device 120, the spatial audio content 102 is rendered to the user 51 using first person respective mediated reality. For example, the additional sound source 140' may have a fixed position in real space as the user 51 changes their point of view 54.

In the examples of FIGS. 4C and 5C, after the user action 137 causes modification of the spatial audio content 102 by splitting it into the first part 113 for the hand portable device 130 and the second part 111 for the spatial audio device 120, the spatial audio content 102, including the re-positioned additional sound source 140', is rendered to the user 51 using first person respective mediated reality. For example, the repositioned additional sound source 140' may have a fixed position in real space as the user 51 changes their point of view 54.

In some, but not necessarily all examples, the first part 113 of the spatial audio content 102 relates to a first voice associated with a first ear of the user 51, at which the hand portable device 130 is positioned. The second part 111 of the spatial audio content relates to at least a second different voice, wherein the spatial audio scene 76 defined by the second part 111 of the spatial audio content 102 is modified to place the second voice 140' at a second ear of the user, opposite the first ear.

In some, but not necessarily all examples, the first voice and the second different voice, may relate to different sound sources within an immersive telephone call. In such an example, the examples of FIGS. 4A to 4C and 5A to 5C may occur in pre-processing before any rendering of the spatial audio content 102. The spatial audio content 102, of the immersive telephone call, may only be rendered, for the first time, after the modification to the second part 111 of the spatial audio content 102 illustrated in FIGS. 4C and 5C has occurred.

Figure 6A:
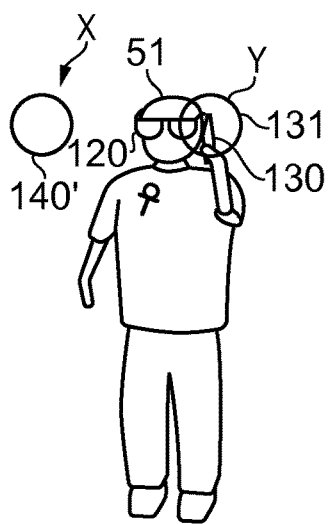
FIGS. 6A, 6B, 6C show another example embodiment of the subject matter described herein.
Figure 6B:
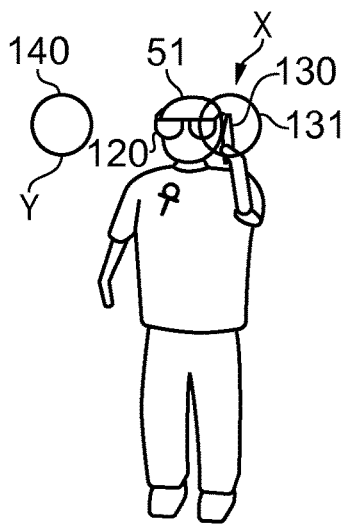
Figure 6C:
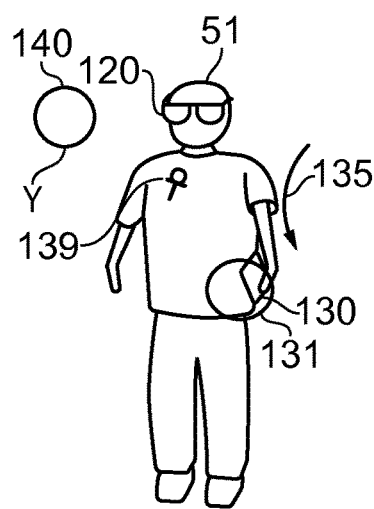

FIGS. 6A to 6C illustrate an example in which the user 51 edits the second part 111 of the spatial audio content 102. The second part 111 of the spatial audio content 102 is edited in response to movement of the hand portable device 130, in this example.

In some, but not necessarily all examples, the user 51 can control allocation of sound sources 140 between the first part 113 for the hand portable device 130 and the second part 111 for the spatial audio device 120. This can be achieved by modifying the allocation information 108.

In some, but not necessarily all examples, the user 51 can control allocation of a sound source 140 by moving the sound source 140 from being rendered as part of the rendered scene 76 by the spatial audio device 120 to being rendered by the hand portable device 130 and/or control reallocation of the sound source 140 from being rendered by the hand portable device 130 to being rendered by the spatial audio device 120.

In other examples, the user can control the balance between the audio output by the hand portable device 130 and the spatial audio device 120 for example by separately controlling the volume of a device or by silencing a sound source 140 rendered by either device.

In the example of FIG. 6A, a primary sound source Y is rendered 131 by the hand portable device 130, which is adjacent the left ear of the user 51. Simultaneously the spatial audio device 120 renders, as a rendered sound scene 76, an additional sound source 140'. This additional sound source 140' is a secondary sound source X. The primary sound source Y may, for example, be a voice in an immersive telephone call. The additional sound source 140' may, for example, be a different voice in the immersive call or other, different content.

As illustrated in FIG. 6B, the system 100 is configured to enable the user 51 to control allocation of sound sources 140 between the rendering devices 120, 130. In this example, the user uses a user interface on the hand portable device 130 to switch the primary source Y with the secondary source X. The primary sound source Y is now rendered as a sound source 140 in the rendered sound scene 76 that is rendered by the spatial audio device 120. This is achieved by modifying the second part 111 of the spatial audio content 102 in response to control signals from the rendering control module 106. The secondary sound source X is now rendered by the hand portable device 130. This is achieved by modifying the first part 113 of the spatial audio content 102 under the control of the rendering control module 106.

As illustrated in FIG. 6C, the user is now able to lower the hand portable device 130 so that the user can no longer hear the secondary sound object X. The user is then able to listen to the primary sound object Y as a sound source 140 in the rendered sound scene 76 that is rendered by the spatial audio device 120.

In some, but not necessarily all examples, the action 135 of lowering the hand portable device 120 may result in the removal of the secondary sound source X from the second part 111 of the spatial audio content 102. A subsequent raising of the hand portable device to the user's ear may then cause the primary sound source Y to be transferred back to the first part 113 of the spatial audio content 102. The user has consequently returned to a situation similar to that illustrated in FIG. 6A except that the additional sound source 140' has been removed from the sound scene 76 rendered by the spatial audio device 120.

In the example of FIG. 6C, if the user 51 is to speak during the immersive call then either the spatial audio device 120 will need to have a microphone or an additional microphone 139 needs to be provided either separately, for example a Lavalier microphone, or by the hand portable device 130.

Figure 7A:
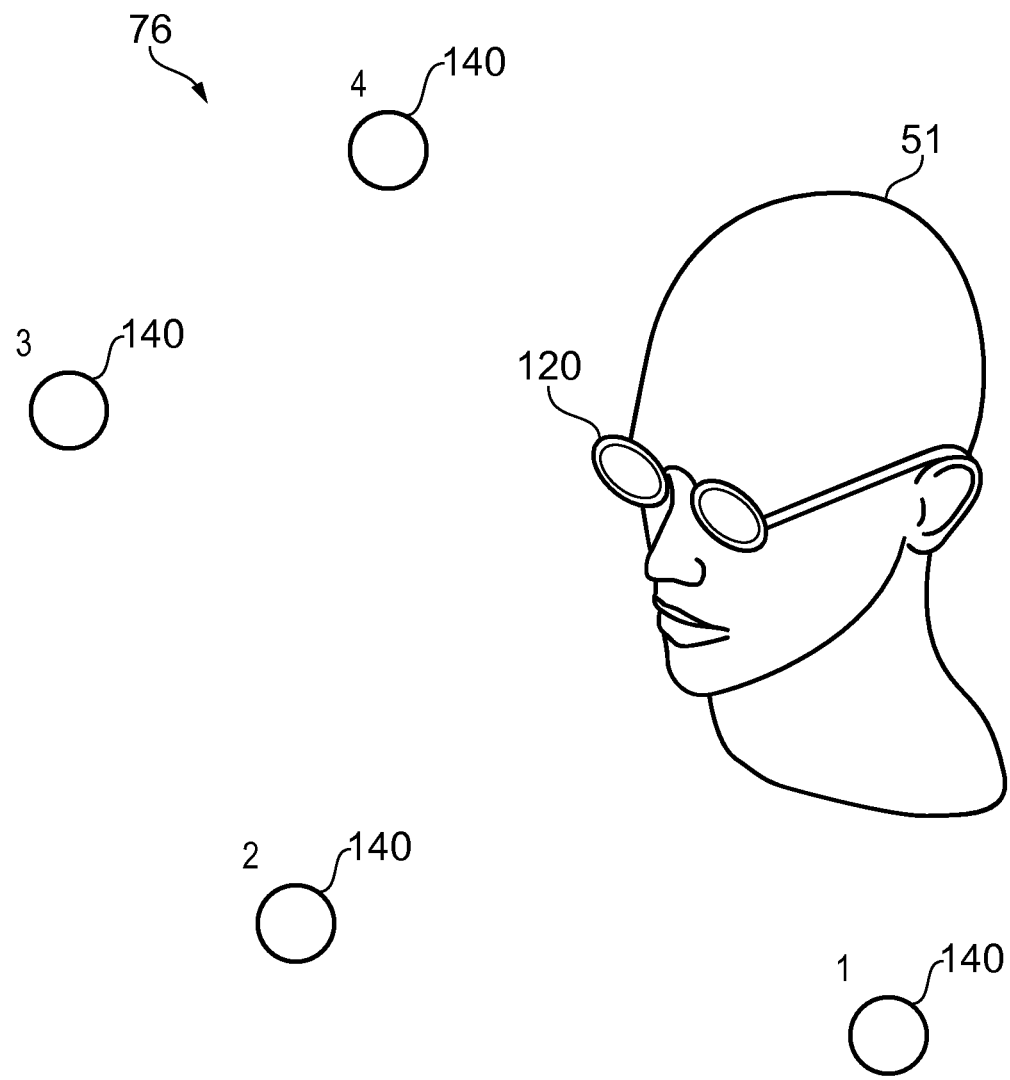
FIGS. 7A, 7B, 7C show another example embodiment of the subject matter described herein.
Figures 7B, 7C:
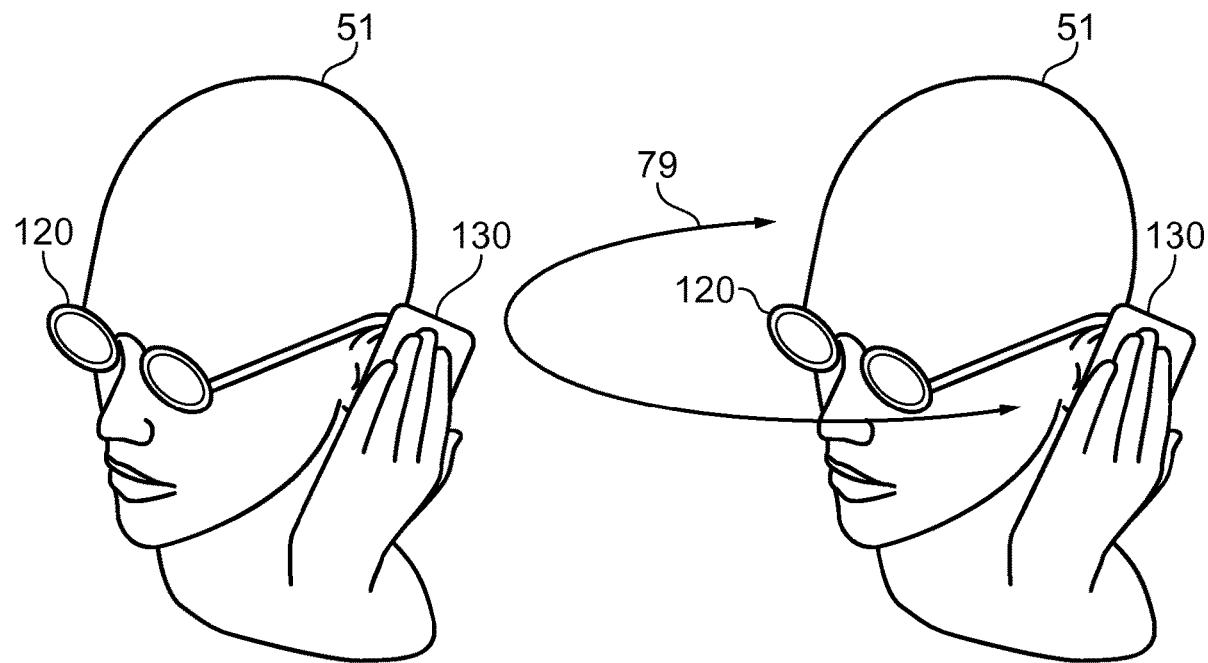

FIG. 7A illustrates an example in which the spatial audio device 120 is rendering spatial audio content 102 to the user 51. The rendered spatial audio content defines a sound scene 76 that comprises multiple sound sources 140. FIG. 7B and FIG. 7C illustrate that the user may perform an action that causes a sound source 140 to be moved from the rendered sound scene 76 so that it is instead rendered from the hand portable device 130. Referring back to FIG. 2, this corresponds to a change in the allocation information 108 such that the rendering control block 106 controls the renderer 110 to place a particular sound source 140 into the first part 113 of the spatial audio content that is rendered by the hand portable device 130. The remaining spatial audio content, minus the particular sound source 140, is provided as a second part 111 of the spatial audio content 102 to the spatial audio device 120 to be rendered as the sound scene 76.

The apparatus 112 consequently comprises a means for simultaneously controlling content rendered by the hand portable device 130 and content rendered by the spatial audio device 120 and providing for rendering to the user 51, in response to an action by the user, of a first part 113, not a second part 111, of a spatial audio content 102 via the hand portable device 130 not the spatial audio device 120.

In this example, there is simultaneous rendering before the action of the user of the first part of the spatial audio content and the second part of the second audio content via the spatial audio device 120 (FIG. 7A). The apparatus 112 comprises means for enabling selection of the first part 113 of the spatial audio content 102 via the user 51 using first-person perspective mediated reality. This is illustrated in FIG. 7C. In the examples FIG. 7C, the user can select 79 a desired sound source 140 by varying the point of view 74 of the user 51 that is used to select the desired sound source 140.

The selected first part 113 of the spatial audio content 102 may be modified before being rendered by the hand portable device 130, for example, to emphasize a particular audio source in a mono downmix.

The user action in this example is lifting the hand portable device 130 to the user's head. As previously described, the apparatus 112 renders to the user 51, the first part 113 of the spatial audio content 102 via the hand portable device 130 and the second part 111 of the spatial audio content 102 via the spatial audio device 120, simultaneously.

In some, but not necessarily all examples, the first part 113 comprises a single sound source 140 selected by the user 51. In other examples, the first part 113 comprises multiple sound sources 140 that are separately and sequentially selected by the user 51.

Figure 8:
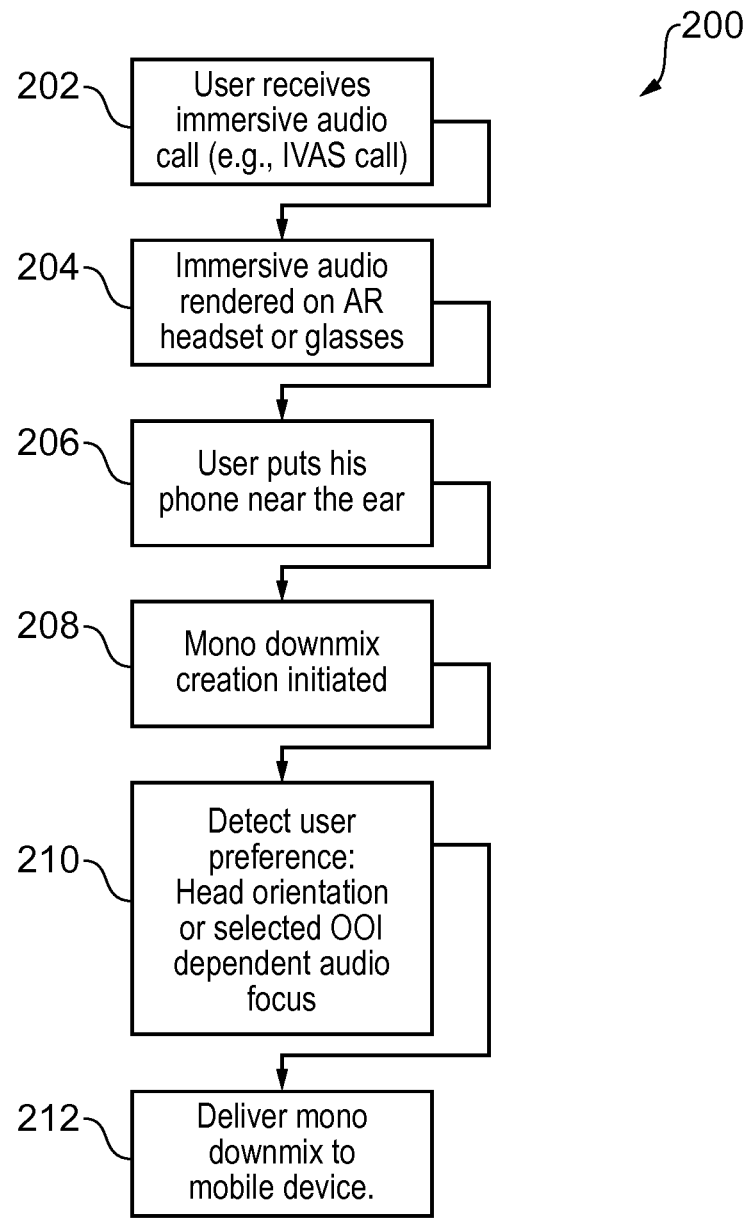
FIG. 8 shows another example embodiment of the subject matter described herein.

FIG. 8 illustrates an example of a method 200 that may be performed by the apparatus 112.

At block 202, the apparatus 112 receives an immersive call. At block 204, the immersive audio 102 is rendered by the spatial audio device 120. At block 206, the apparatus 112 detects that the user 51 has raised the hand portable device 130 to be adjacent to the user's ear. At block 208, the first part 113 of the spatial audio content 102 is created by the renderer 110 in response to rendering control block 106. In some examples, all of the spatial audio content 102 of the immersive call is down-mixed to form a single first part 113 that is rendered by the hand portable device 130. In this example, the renderer 110 may not provide any second part 111 of the spatial audio content 102 to the spatial audio device 120. In other examples, the renderer 110 under the control of the rendering control block 106 controls the second part 111 of the spatial audio content to comprise one or more particular sound sources 140. In this example, the second part 111 of the spatial audio content 102 comprises that part of the spatial audio content 102 remaining after the subtraction of the first part 113.

At block 210, the apparatus 112 responds to a change in the point of view 54 of the user 51. This change of point of view is provided as allocation information 108 and causes a change in the selection of the audio content for rendering by the hand portable device 130.

For example, the mono downmix created from the spatial audio content 102 may be created with an emphasis on one or more sound sources in a particular direction of arrival that corresponds to the point of view 54 of the user 51. Likewise, the selection of a particular sound source 140 may correspond to a sound source that is aligned with the point of view 54 of the user 51. Therefore, as the point of view 54 of the user 51 changes, then the content of the first part 113 of the spatial audio content 102 also changes.

At block 212, the first part 113 of the spatial audio content 102 is delivered, for rendering, to the hand portable device 130.

Figure 9A:
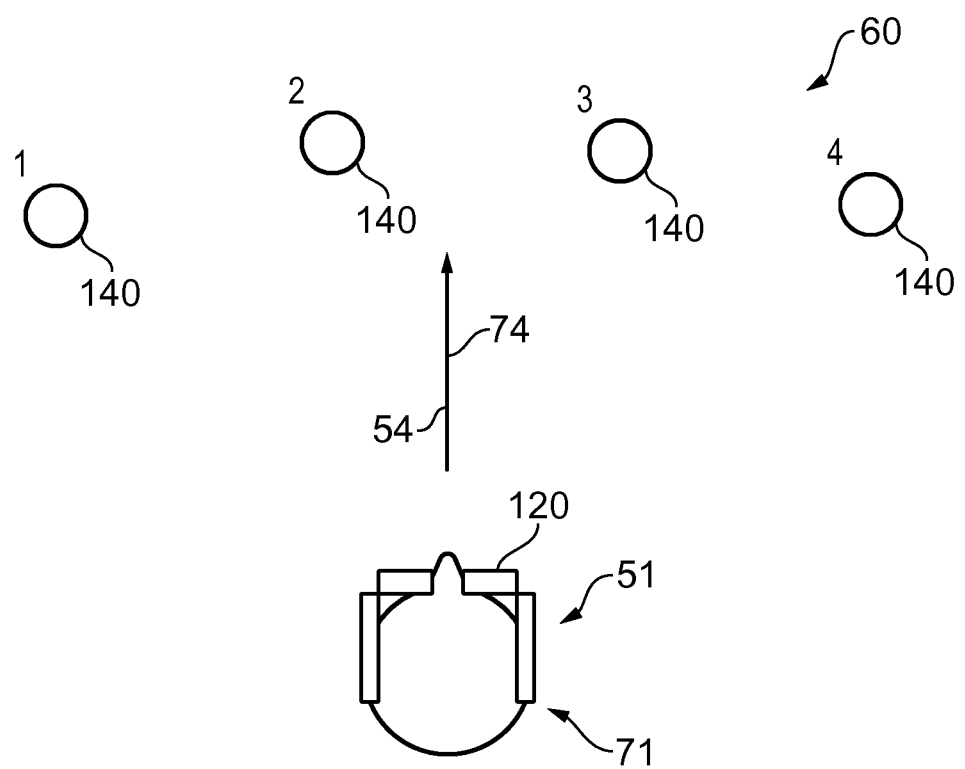
FIGS. 9A, 9B, 9C, 9D, 9E show another example embodiment of the subject matter described herein.

FIGS. 9A to 9E illustrate, in detail, how the apparatus 112 enables selection of the first part of the spatial audio content by the user using first-person perspective mediated reality. FIG. 9A illustrates the virtual user 71 who has a point of view 74 within a sound space 60 that comprises sound sources 140. As previously described, in the first-person perspective mediated reality, there is a correspondence between the virtual user 71 and the user 51 and the point of view 74 of the virtual user 71 and the point of view 54 of the user 51. The user 51 varies the point of view 54 by changing an orientation of the user's head. This changes the virtual point of view 74.

In this immersive audio scene, the rendered sound scene 76 comprises multiple sound sources 140. These sound sources are fixed in space, in this example, so that when the user 51 changes his point of view 54, the positions of the sound sources 140 relative to the user 51 also change.

Figure 9B:
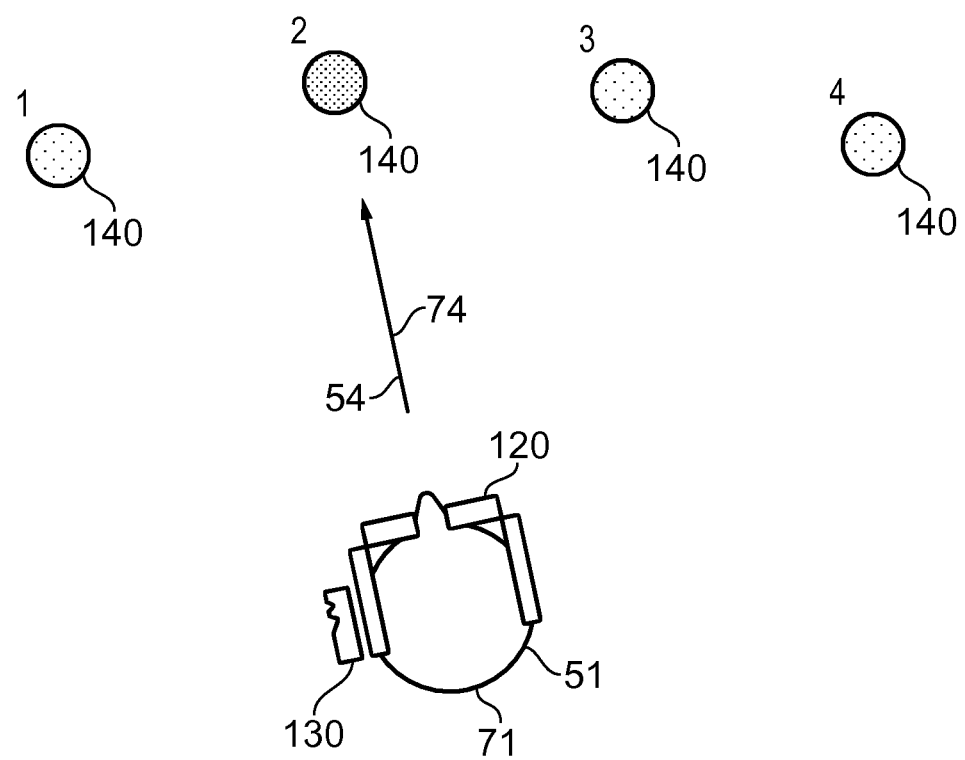

In the example of FIG. 9B, the user has raised the hand portable device 130 to his left ear or performed any other suitable gesture to cause rendering of the first part 113 of the spatial audio content 102 via the hand portable device 130 and rendering of the second part 111 of the spatial audio content 102 via the spatial audio device 120. The first part 113 of the spatial audio content emphasises the sound source 140 that is aligned with or closest to the point of view 74 of the virtual user 71. In the example of a mono downmix, the mono downmix is emphasised in the direction of the virtual point of view 74. In the example of sound objects, or the selection of particular sound sources 140, the point of view 74 selects the sound source 140 that is aligned with or closest to the virtual point of view 74. The selected sound source 140 is included in the first part 113 but is not included in the second part 111 of the spatial audio content 102. In the example of FIG. 9B, the sound source 140 labeled "2" is selected and emphasised in the first part 113 of the spatial audio content 102.

Figure 9C:
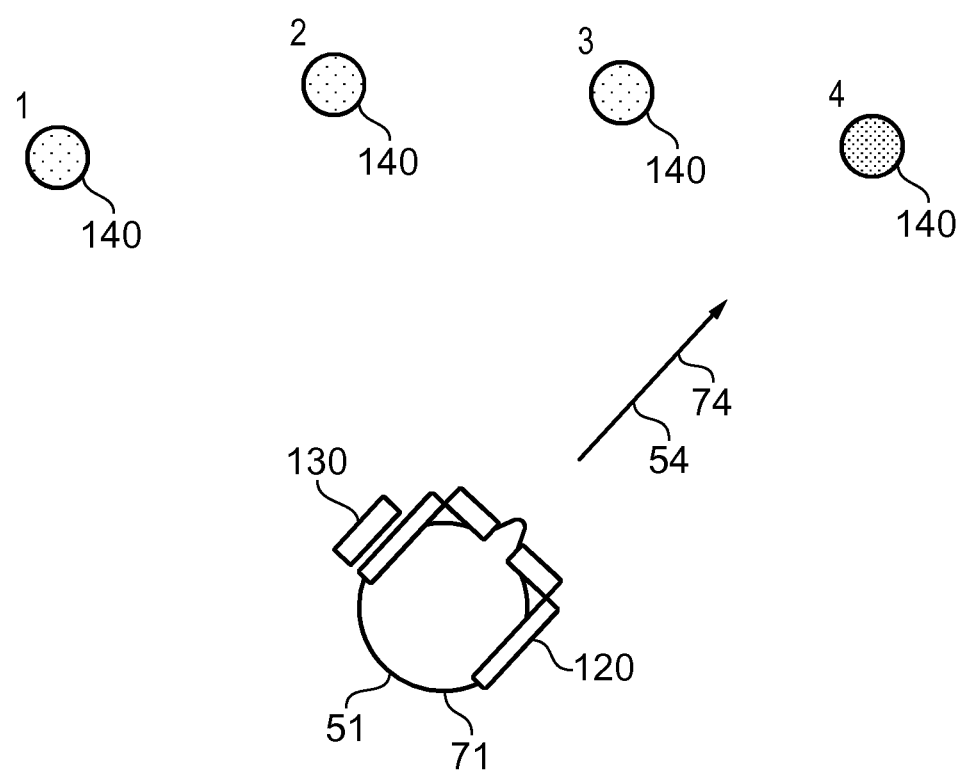

In the example of FIG. 9C, the user 51 has changed his point of view 54 by changing an orientation of his head. This causes a consequent change in the point of view 74 of the virtual user 71. The change in the point of view 74 of the virtual user changes which part of the sound scene is emphasised in the first part 113 of the spatial audio content 102. The selection is as described for FIG. 9B, the only difference being the change in the point of view 74. In the example of FIG. 9C, the sound source 140 labeled "4" is selected and emphasised in the first part 113 of the spatial audio content 102.

Figure 9D:
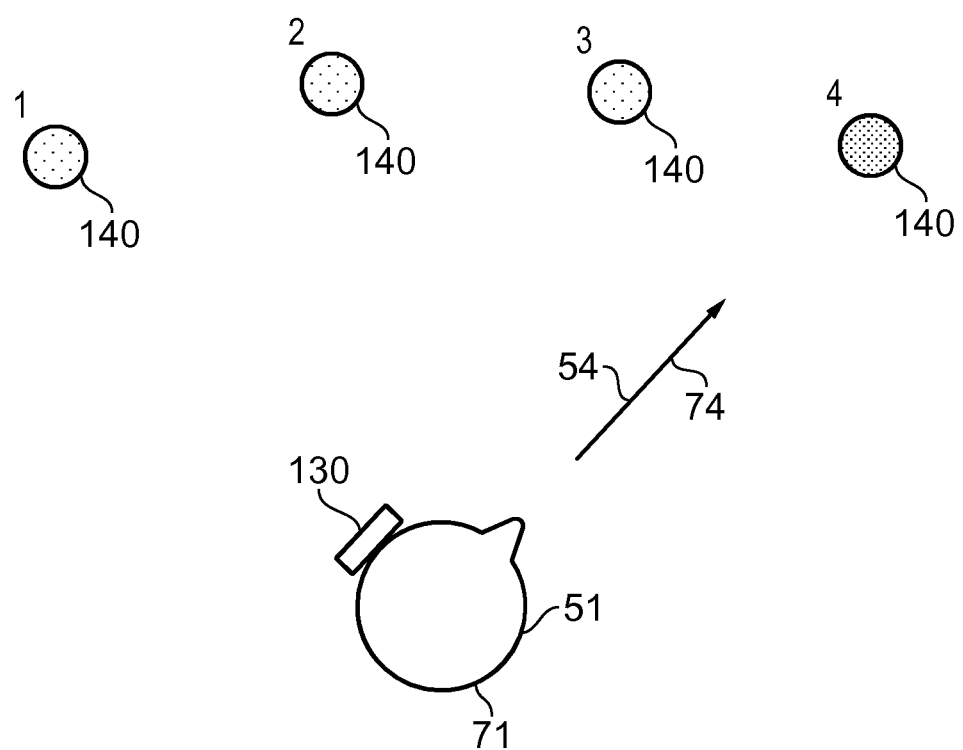
Figure 9E:
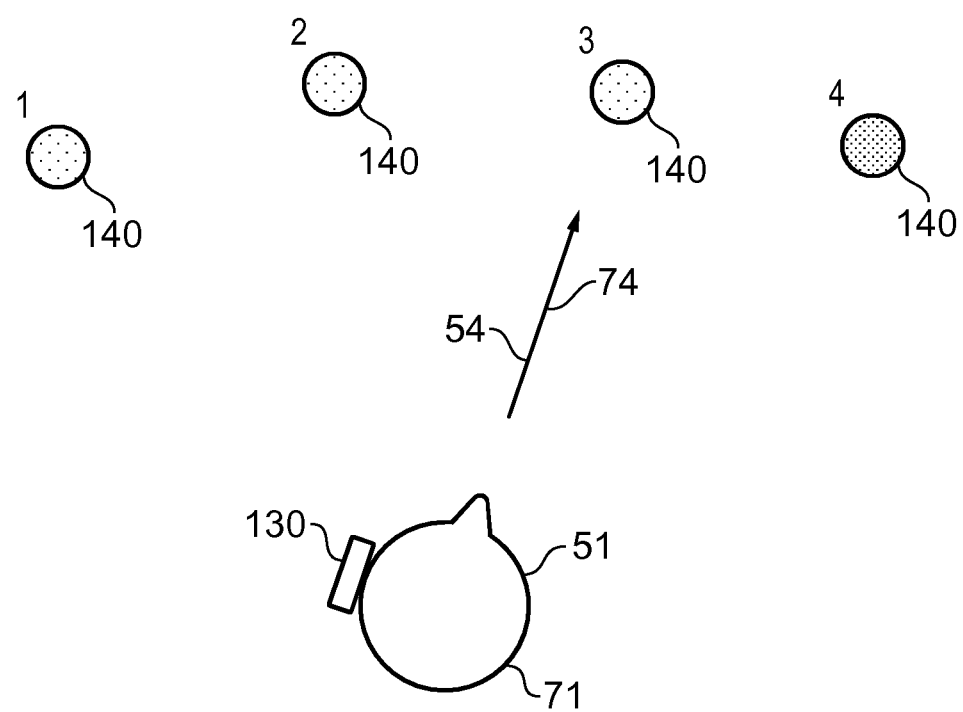

In the example of FIG. 9D, the user 51 has removed the spatial audio device 120. The selected sound source 140 is now frozen. In the example of FIG. 9D, the sound source 140 labeled "4" is selected and emphasised. Subsequent movement of the user's head and a change in the point of view 54 of the user 51 does not change the point of view 74 of the virtual user 71. There is consequently no change in the selection of the emphasised sound source 140, as illustrated in FIG. 9E. In the example of FIG. 9E, the sound source labeled "4" remains the emphasised sound source 140 in the first part 113 of the spatial audio content 102.

It will therefore be appreciated that while the user wears the spatial audio device 120, which has head tracking capabilities, first-person perspective mediated reality is enabled. The point of view 54 of the user 51 and the virtual point of view 74 of the virtual user 71 correspond and track each other. The virtual point of view 71 is used to emphasise particular sound sources 140 within the spatial audio content that are aligned with the virtual point of view 74. The particular sound sources 140 are emphasised in the first part 113 of the spatial audio content 102. The emphasised sound source 140 can be varied by varying the user's point of view 54, which changes the virtual user's point of view 74. However, once the spatial audio device 120 is removed, it is no longer possible to track the head movements of the user 51 and point of view 54 of the user and virtual point of view 74 of the virtual user are decoupled. Consequently, a change in the point of view 54 of the user 51 does not cause a change in the virtual point of view 74 of the virtual user 71 and does not cause a change in the selected sound source 140 for emphasis in the first part 113 of the spatial audio content 102.

Figure 10A:
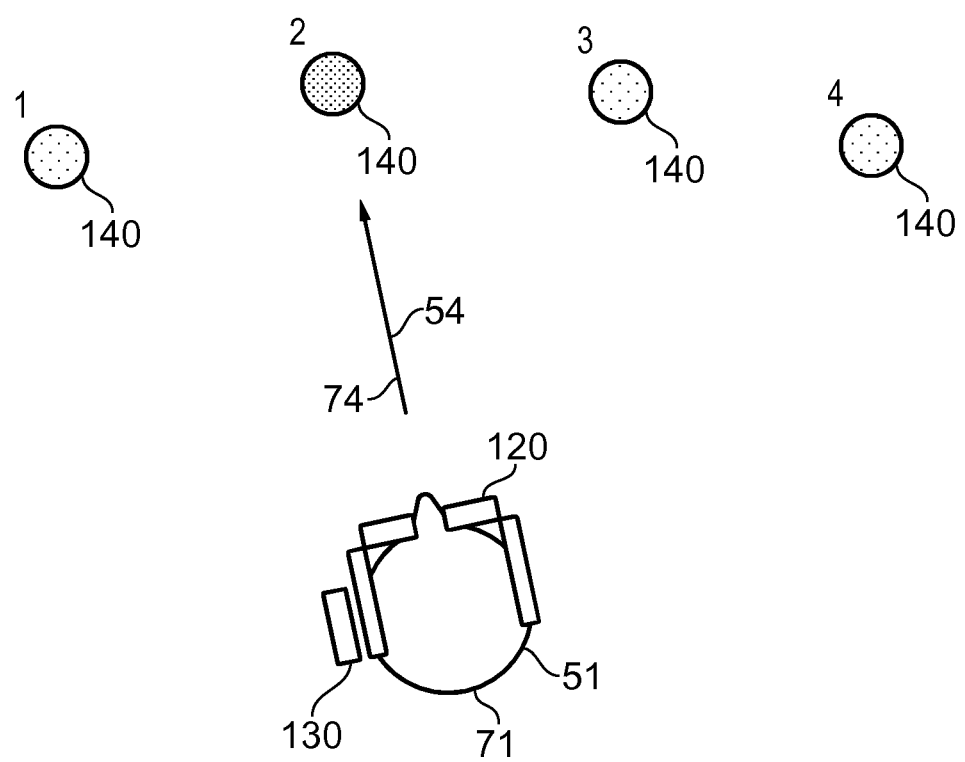
FIGS. 10A, 10B, 10C, 10D show another example embodiment of the subject matter described herein.
Figure 10B:
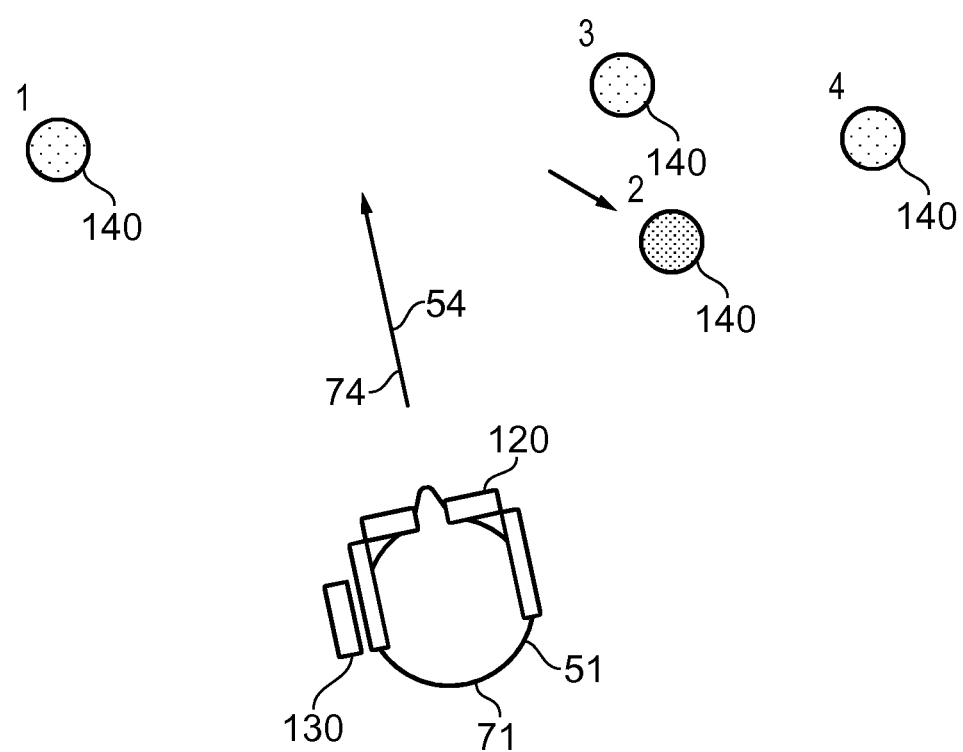

In the examples of FIGS. 10A and 10B, a user 51 selects a particular sound source 140 and this sound sources is emphasised irrespective of subsequent relative changes in alignment between the virtual point of view 74 and the selected sound source 140. This lack of alignment may, for example, arise because the selected sound source 140 is moving and/or because the user 51 changes his point of view 54. A consequence of this is that a selected moving sound source 140 is rendered as if the moving sound source were stationary.

In FIG. 10A, the point of view 74 of the virtual user 71 is aligned with a particular sound object 140. This alignment selects the particular sound object 140 which is then included in the first part 113 of the spatial audio content and is rendered by the hand portable device 130. The selection of the sound object 140 may be as a consequence of an action by the user 51.

In FIG. 10B, the selected sound source 140 has moved but the point of view 74 of the virtual user 71 has not moved. Despite the point of view 74 of the virtual user 71 no longer pointing towards the selected sound object 140, the selected sound object 140 remains selected and is included in the first part 113 of the spatial audio content rendered by the hand portable device 130. The selected sound object 140 remains selected based on tracking, rather than user point of view, and is included in the first part 113 of the spatial audio content rendered by the hand portable device 130. The position of the selected sound object 140 can be tracked and the manner in which it is included in the first part 113 of the spatial audio content rendered by the hand portable device 130 can change with a changing tracked position of the selected sound object 140 Consequently, the sound objects "1", "3", "4" are rendered by the spatial audio device 120, controlled by the second part 111 of the spatial audio content 102 in both FIGS. 10A and 10B. Also, the sound object "2" is rendered by the hand portable device 130, under the control of the first part 113 of the spatial audio content 102, in both FIGS. 10A and 10B.

In the example of 10C, the spatial audio device 120 has been removed. Despite this, the selected spatial sound object 2 remains selected and continues to be rendered by the hand portable device 130, under the control of the first part 113 of the spatial audio content 102, even if it is moving.

Figure 10C:
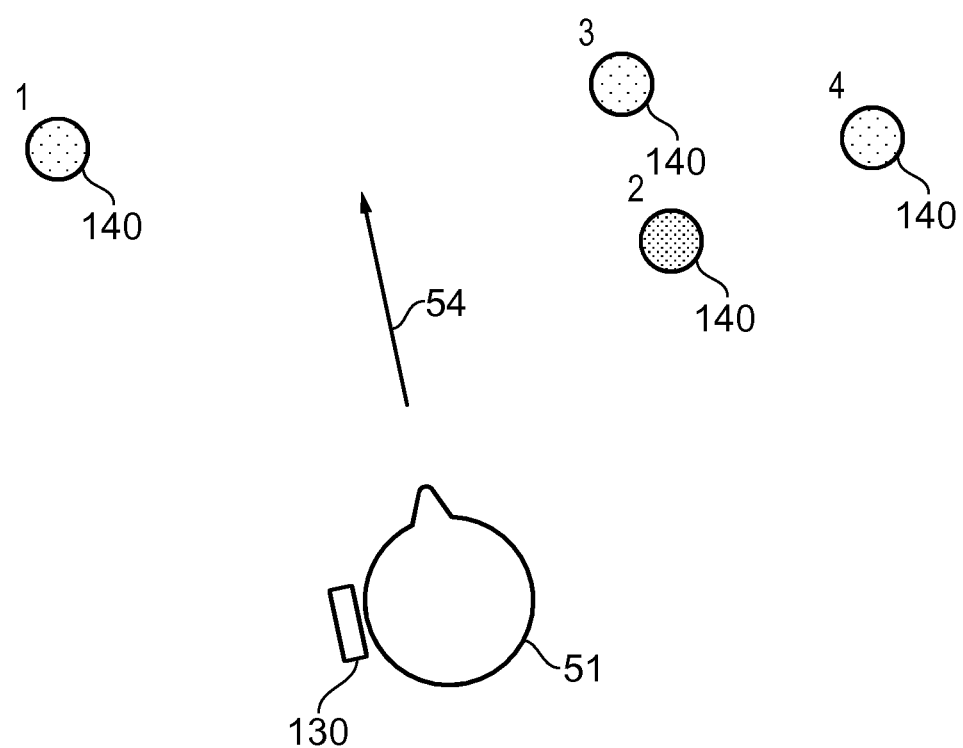
Figure 10D:
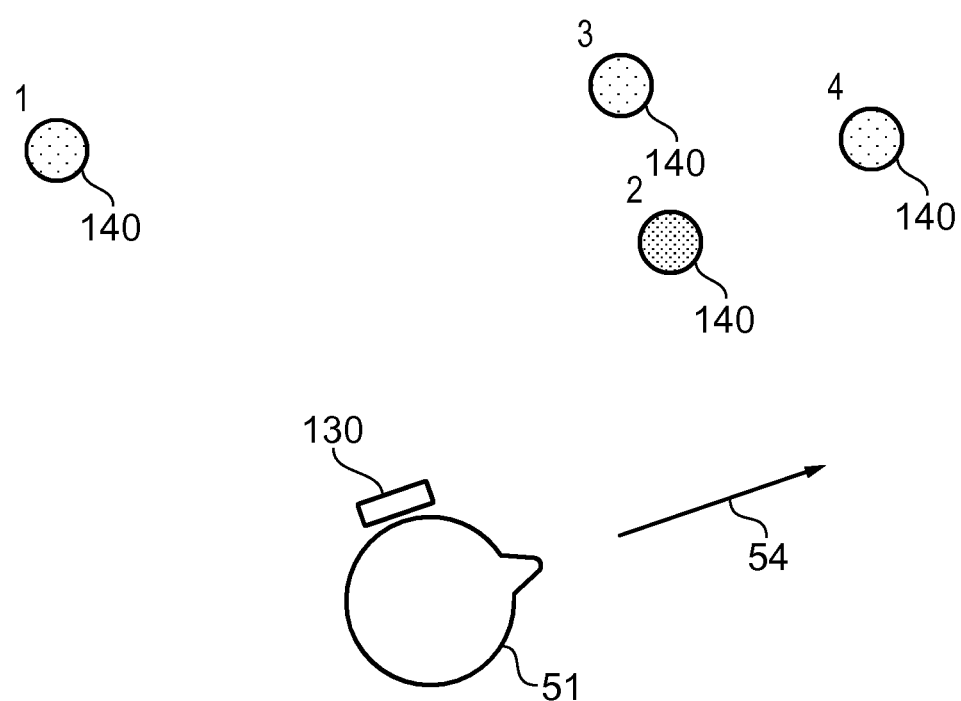

FIG. 10D illustrates that even if the user 51 changes his point of view 54, the selected sound object "2" continues to be rendered by the hand portable device 130, under the control of the first part 113 of the spatial audio content 102, as previously in FIGS. 10A to 10C.

Referring back to the examples illustrated in FIGS. 9B and 9C, it will be appreciated that when the user 51 changes his point of view 54, he changes the point of view 74 of the virtual user, which changes the sound source 140 that is emphasised in the first part 113 of the spatial audio content 102 rendered by the hand portable device 130. In the example where the sound source 140 that is emphasised is a sound object, the remaining sound objects of the sound scene are rendered by the spatial audio device 120. That is, the first part 113 of the spatial audio content 102 includes the sound object "2" and the second part 111 of the spatial audio object includes the sound objects "1", "3", "4". When the user changes orientation, changing the point of view 54, then the virtual point of view 74 of the user also changes. This is illustrated in FIG. 9C. As previously described, this changes the sound object selected. The first part 113 of the spatial audio content 102 includes the sound object "4". Consequently, the content of the second part 111 of the spatial audio content now includes the sound objects "1", "2", "3". In addition, as the spatial audio device 120 enables first-person perspective mediated reality, the positions of the sound objects "1" and "3" rendered to the user via the spatial audio device 120 have been rotated relative to the user comparing FIGS. 9B and 9C as a consequence of the change in the point of view of the virtual user. Similar considerations also apply to FIGS. 10A to 10D.

It will therefore be appreciated that the apparatus 112 enables adaptation of the second part 111 of the spatial audio content 102 using first-person perspective mediated reality, after the user action that determines the first part 113 of the audio content 102, while using at least the spatial audio device 120. The apparatus 112 also enables rendering of the adapted second part 111 of the spatial audio content 102 via at least the spatial audio device 120.

In some, but not necessarily all, examples, the user 51 may be able to lock the selected object without locking the spatial audio scene. As a consequence, the apparatus 112 is capable of rendering a second part 111 of the spatial audio content 102 via the spatial audio device 120 where the second part 111 has been adapted in accordance with first-person perspective mediated reality.

The user may also be capable of locking the rendered sound scene 76 in response to a subsequent user action. The apparatus 112 is then configured to disable, after this subsequent user action, adaptation of the second part 111 of the spatial audio content in accordance with first-person perspective mediated reality and cause rendering of the second part 111 of the spatial audio content 102 in accordance with a fixed first-person perspective via the spatial audio device 120.

In the example of FIG. 9B, the removal of the spatial audio device 120 simultaneously locks the object and locks the scene.

Figure 11B:
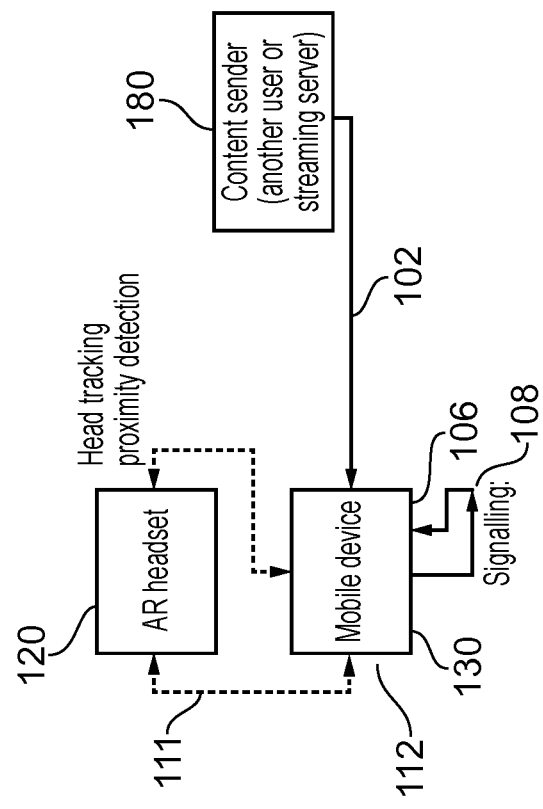
FIGS. 11A, 11B show another example embodiment of the subject matter described herein.
Figure 11A:
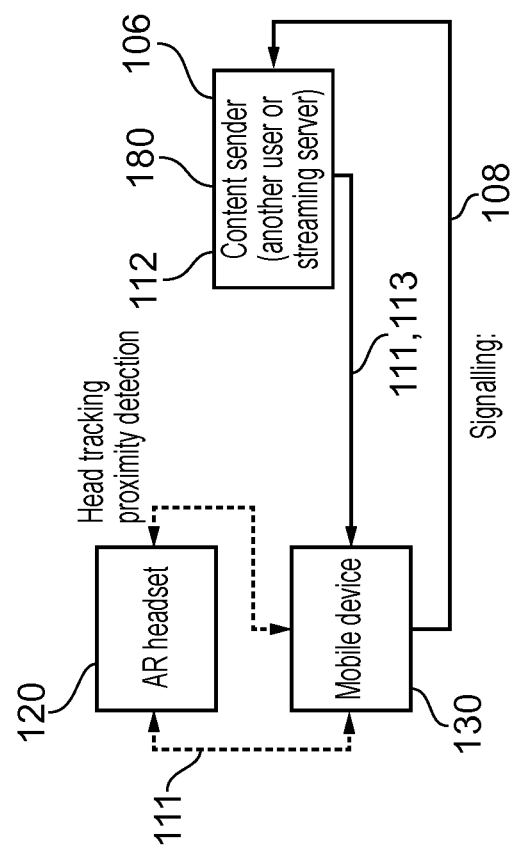

FIG. 11A illustrates an example of an implementation of the system 100 illustrated in FIG. 2, the operation of which has been described in the previous description. In this example, the allocation information 108 is provided from the hand portable device 130 to a remote server 180 that comprises the rendering control block 106. In this example, the server 180 also comprises the renderer 110. However, in other examples, it may be located in the hand portable device 130.

The renderer 110 under the control of the rendering control block 106 provides the first part 111 and the second part 111 of the spatial audio content 102 to the hand portable device 130 in a manner that allows the hand portable device 130 to render the first part 113 and to provide the second part 111 to the spatial audio device 120 for rendering. The hand portable device 130 provides allocation information 108 to the server 180. This may, for example, include indications of user actions that are associated with control commands.

FIG. 11B illustrates an example of an implementation of the system 100 illustrated in FIG. 2, the operation of which has been described in the previous description. In this example, the allocation information 108 is provided internally within the hand portable device 130 that comprises the rendering control block 106. In this example, the hand portable device 130 comprises the renderer 110. The server 180 provides the spatial audio content 102.

The renderer 110 under the control of the rendering control block 106 provides the first part 111 and the second part 111 of the spatial audio content 102 to the hand portable device 130 in a manner that allows the hand portable device 130 to render the first part 113 and to provide the second part 111 to the spatial audio device 120 for rendering. The allocation information 108 may, for example, include indications of user actions that are associated with control commands.

Figure 12A:
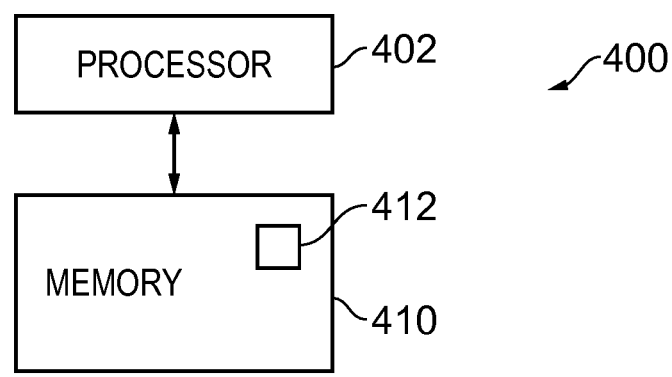
FIGS. 12A, 12B, show another example embodiment of the subject matter described herein.

FIG. 12A illustrates an example of a controller 400. Such a controller may be used to control performance of any or all of the functions of the apparatus 112, control performance of any or all of the functions of the hand portable device 130, control performance of any or all of the functions of the spatial audio device 120.

Implementation of a controller 400 may be as controller circuitry. The controller 400 may be implemented in hardware alone, have certain aspects in software including firmware alone or can be a combination of hardware and software (including firmware).

As illustrated in FIG. 12A the controller 400 may be implemented using instructions that enable hardware functionality, for example, by using executable instructions of a computer program 412 in a general-purpose or special-purpose processor 402 that may be stored on a computer readable storage medium (disk, memory etc) to be executed by such a processor 402.

The processor 402 is configured to read from and write to the memory 410. The processor 402 may also comprise an output interface via which data and/or commands are output by the processor 402 and an input interface via which data and/or commands are input to the processor 402.

The memory 410 stores a computer program 412 comprising computer program instructions (computer program code) that controls the operation of the apparatus 112 when loaded into the processor 402. The computer program instructions, of the computer program 412, provide the logic and routines that enables the apparatus to perform the methods illustrated in FIGS. 1 to 13. The processor 402 by reading the memory 410 is able to load and execute the computer program 412.

The apparatus 112 therefore comprises:
at least one processor 402; and
at least one memory 410 including computer program code
the at least one memory 410 and the computer program code configured to, with the at least one processor 402, cause the apparatus 112 at least to perform:
simultaneously controlling content rendered by a hand portable device 130 and content rendered by a spatial audio device 120; and
providing for rendering to a user 51, in response to an action by the user, of a first part 113, not a second part, of a spatial audio content 102 via the hand portable device not the spatial audio device 120.

The apparatus 112 can therefore comprises:
at least one processor 402; and
at least one memory 410 including computer program code
the at least one memory 410 and the computer program code configured to, with the at least one processor 402, cause the apparatus 112 at least to perform:
simultaneously controlling content rendered by a hand portable device 130 and content rendered by a spatial audio device 120; and
providing for rendering to a user 51, in response to an action by the user, of a first part 113, not a second part, of a spatial audio content 102 via the hand portable device not the spatial audio device 120.

Figure 12B:
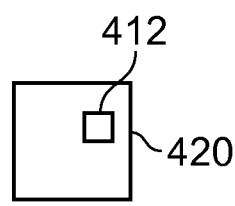

As illustrated in FIG. 12B, the computer program 412 may arrive at the apparatus 112 via any suitable delivery mechanism 420. The delivery mechanism 420 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 412. The delivery mechanism may be a signal configured to reliably transfer the computer program 412. The apparatus 11 may propagate or transmit the computer program 412 as a computer data signal.

In at least some examples, the computer program instructions are configured to cause an apparatus to perform at least the following:
simultaneously controlling content rendered by a hand portable device 130 and content rendered by a spatial audio device 120; and
causing rendering to a user 51, in response to an action by the user, of a first part 113, not a second part, of a spatial audio content 102 via the hand portable device not the spatial audio device 120.

The computer program instructions may be comprised in a computer program, a non-transitory computer readable medium, a computer program product, a machine readable medium. In some but not necessarily all examples, the computer program instructions may be distributed over more than one computer program.

Although the memory 410 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a hand portable device or a similar integrated circuit in a server, a cellular network device, or other computing or network device.

The blocks illustrated in the FIGS. 1 to 13 may represent steps in a method and/or sections of code in the computer program 412. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one non-transitory memory including computer program code, the at least one memory and the computer program code configured to, with the at least one processor, cause the apparatus to perform at least the following:
  simultaneously controlling content rendered via a hand portable device and a spatial audio device;
  providing for simultaneous rendering to a user, prior to an action of the user, of a first part of a spatial audio content and a second part of the spatial audio content via the spatial audio device;
  in response to the action of the user, splitting the spatial audio content into, at least, the first part and the second part, wherein the content comprises, at least, the spatial audio content; and
  providing for rendering to the user, in response to the action of the user, of the first part, and not the second part, of the spatial audio content via the hand portable device, wherein providing the first part of the spatial audio content for rendering via the hand portable device comprises downmixing the first part of the spatial audio content to produce a modified first part of the spatial audio content.

2. The apparatus as claimed in claim 1, further caused to perform simultaneous rendering to the user, in response to the action of the user, of the first part of the spatial audio content via the hand portable device and the second part of the spatial audio content via the spatial audio device.

3. The apparatus as claimed in claim 1, wherein the spatial audio content is received from a communication network via the apparatus as a downlink communication channel from a remote person and wherein the first part of the spatial audio content comprises a voice of the remote person.

4. The apparatus as claimed in claim 1, further caused to perform communicating with at least one of the hand portable device or the spatial audio device to determine when the action of the user has occurred, wherein the action of the user comprises movement of the hand portable device towards a head of the user.

5. The apparatus as claimed in claim 2, wherein a spatial audio scene defined with the second part of the spatial audio content is modified in dependence upon a position of the hand portable device.

6. The apparatus as claimed in claim 5, wherein the first part of the spatial audio content relates to a first voice associated with a first ear of the user, at which the hand portable device is positioned, and wherein the second part of the spatial audio content relates to at least a second different voice, wherein the spatial audio scene defined with the second part of the spatial audio content is modified to place the second voice at a second ear of the user, opposite the first ear.

7. The apparatus as claimed in claim 1, further caused to perform, responsive to movement of the hand portable device, editing of the second part of the spatial audio content.

8. The apparatus as claimed in claim 1, wherein the first part of the spatial audio content relates to an incoming call and the second part of the spatial content relates, at least, to at least part of the content rendered via the spatial audio device that continues to be rendered after receiving the incoming call.

9. The apparatus as claimed in claim 1, further caused to perform enabling selection of the first part of the spatial audio content by the user using first-person-perspective mediated reality.

10. The apparatus as claimed in claim 9, wherein the first part of the spatial audio content is an audio object selected via a direction of user attention or an audio scene selected via the direction of user attention, or wherein the first part of the spatial audio content is a first moving audio object, wherein the first part of the audio content is rendered as if the first moving audio object were stationary.

11. A method comprising:
  simultaneously controlling content rendered via a hand portable device and a spatial audio device;
  providing for simultaneous rendering to a user, prior to an action of the user, of a first part of a spatial audio content and a second part of the spatial audio content via the spatial audio device;
  in response to the action of the user, splitting the spatial audio content into, at least, the first part and the second part, wherein the content comprises, at least, the spatial audio content; and
  providing for rendering to the user, in response to the action of the user, of the first part, and not the second part, of the spatial audio content via the hand portable device and not the spatial audio device, wherein providing the first part of the spatial audio content for rendering via the hand portable device comprises downmixing the first part of the spatial audio content to produce a modified first part of the spatial audio content.

12. The method as claimed in claim 11, further comprising causing simultaneous rendering before the action of the user, of the first part of the spatial audio content and the second part of the spatial audio content via the spatial audio device.

13. The method as claimed in claim 11, further comprising causing simultaneous rendering to the user, in response to the action of the user, of the first part of the spatial audio content via the hand portable device and the second part of the spatial audio content via the spatial audio device.

14. The method as claimed in claim 11, wherein the spatial audio content is received from a communication network as a downlink communication channel from a remote person and wherein the first part of the spatial audio content comprises a voice of the remote person.

15. The method as claimed in claim 11, further comprising communicating with at least one of the hand portable device or the spatial audio device to determine when the action of the user has occurred, wherein the action of the user comprises movement of the hand portable device towards a head of the user.

16. The method as claimed in claim 13, wherein a spatial audio scene defined with the second part of the spatial audio content is modified in dependence upon a position of the hand portable device.

17. A non-transitory computer readable medium comprising program instructions stored thereon for performing at least the following:
  simultaneously controlling content rendered via a hand portable device and a spatial audio device;
  providing for simultaneous rendering to a user, prior to an action of the user, of a first part of a spatial audio content and a second part of the spatial audio content via the spatial audio device;
  in response to the action of the user, splitting the spatial audio content into, at least, the first part and the second part, wherein the content comprises, at least, the spatial audio content; and
  providing for rendering to the user, in response to the action of the user, of the first part, and not the second part, of the spatial audio content via the hand portable device, wherein providing the first part of the spatial audio content for rendering via the hand portable device comprises downmixing the first part of the spatial audio content to produce a modified first part of the spatial audio content.

\* \* \* \* \*